(12) United States Patent  
Fujiwara et al.

(10) Patent No.: US 7,648,943 B2  
(45) Date of Patent: *Jan. 19, 2010

(54) AZO DYE, INK JET RECORDING INK, HEAT SENSITIVE RECORDING MATERIAL, COLOR TONER, COLOR FILTER, INK JET RECORDING METHOD, INK CARTRIDGE AND INK JET PRINTER

(75) Inventors: Toshiki Fujiwara, Minami-Ashigara (JP); Yoshihiko Fujie, Minami-Ashigara (JP); Yoshiharu Yabuki, Minami-Ashigara (JP); Masaru Takasaki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 561 days.

This patent is subject to a terminal disclaimer.

(21) Appl. No.: 11/175,500

(22) Filed: Jul. 7, 2005

(65) Prior Publication Data

US 2006/0009357 A1    Jan. 12, 2006

(30) Foreign Application Priority Data

Jul. 8, 2004  (JP) .............................. 2004-201449  
Oct. 20, 2004 (JP) .............................. 2004-305616  
Jun. 7, 2005  (JP) .............................. 2005-166948

(51) Int. Cl.  
    *B41M 5/035*    (2006.01)  
    *C09B 37/00*    (2006.01)  
    *C09D 11/00*    (2006.01)

(52) U.S. Cl. .................. 503/227; 8/471; 106/31.47; 106/31.49; 347/100; 347/105; 534/753; 534/770

(58) Field of Classification Search ........................ None  
See application file for complete search history.

(56) References Cited

U.S. PATENT DOCUMENTS

| 4,734,349 | A  | 3/1988  | Chapman et al. |
|-----------|----|---------|----------------|
| 4,939,118 | A  | 7/1990  | Etzbach et al. |
| 6,835,240 | B2 | 12/2004 | Nishita et al. |
| 2001/0029869 | A1 | 10/2001 | Fujiwara |
| 2002/0107301 | A1 | 8/2002  | Yamanouchi et al. |
| 2004/0035322 | A1 | 2/2004  | Ishizuka et al. |

FOREIGN PATENT DOCUMENTS

| DE | 23 52 831     | 4/1975  |
|----|---------------|---------|
| EP | 0 340 722 A2  | 11/1989 |
| JP | 2002-371079   | 12/2002 |
| WO | 02/083662 A2  | 10/2002 |
| WO | 02/083795 A2  | 10/2002 |

*Primary Examiner*—Bruce H Hess  
(74) *Attorney, Agent, or Firm*—Buchanan Ingersoll & Rooney PC

(57) ABSTRACT

An azo dye represented by formula (II) as defined in the specification, a process of producing the same and a coloring composition containing the azo dye.

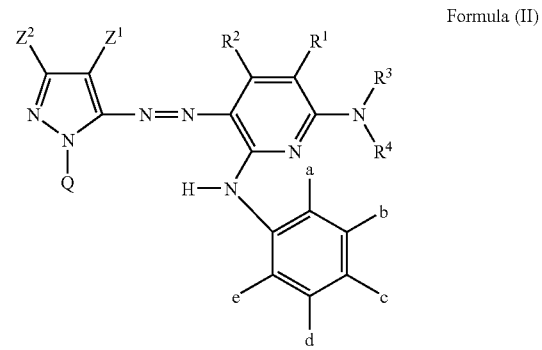

Formula (II)

21 Claims, No Drawings

AZO DYE, INK JET RECORDING INK, HEAT SENSITIVE RECORDING MATERIAL, COLOR TONER, COLOR FILTER, INK JET RECORDING METHOD, INK CARTRIDGE AND INK JET PRINTER

BACKGROUND OF THE INVENTION

1. Field of the Invention

This invention relates to a novel azo dye, an ink jet recording ink, a heat sensitive recording material, a color toner, a color filter, an ink jet recording method, an ink cartridge and an ink jet printer.

2. Description of the Related Art

Color image recording materials have now come to be the mainstream of image recording materials. Currently prevailing color image recording materials include ink jet recording materials, thermal transfer image recording materials, electrophotographic recording materials, transfer type silver halide light-sensitive materials, printing inks, and recording pens. Color filters are used in displays, such as liquid crystal displays (LCDs) and plasma display panels (PDPs), and solid-state image sensors, such as charge coupled devices (CCDs).

In the color image recording materials described above, while coloring materials (dyes or pigments) of three primary colors for so-called subtractive color mixing system have been used for reproducing or recording full color images, coloring materials having absorption characteristics capable of attaining preferred color reproducing regions and which are fast being endurable to various working conditions have not been yet available at present and improvement therefor has been demanded strongly.

Ink jet recording has been popularized rapidly and will see further development because of low material cost, high speed, low noise, and ease of color recording.

Fundamentally, ink jet recording is divided into a continuous method in which ink droplets are continuously allowed to fly and a drop-on-demand method in which ink droplets are ejected in response to image information signals. The mechanism of drop formation includes a piezoelectric system in which pressure is applied to ink by a piezoelectric element to eject ink droplets, a thermal system in which heat is applied to ink to create bubbles whereby to eject an ink droplet, an ultrasonic system, and an electrostatic system. Ink jet inks include aqueous ink, oily ink, and hot-melt or solid ink.

Colorants used in the ink jet recording inks are required to have good solubility or dispersibility in ink solvents, capability of high-density recording, satisfactory hues, color fastness against light, heat, active gases in the atmosphere (e.g., $NO_x$, oxidizing gases such as ozone, $SO_x$, etc.), resistance against water and chemicals, good fixability on media with minimized blur, stability in ink formulations, nontoxicity, high purity, and inexpensiveness.

It is extremely difficult to obtain dyes that satisfy high levels of these requirements, nevertheless. In particular, there has been a strong demand for colorants with a satisfactory magenta hue that are fast to light and environmental active gases, particularly oxidizing gases such as ozone.

Widely used couplers for azo dyes include phenols, naphthols, and anilines. JP-A-11-209673 and Japanese Patent 3020660 disclose azo dyes with satisfactory hues that are obtained using these couplers, which have turned out to have a disadvantage of poor light fastness. Improvement has been added in JP-A-2001-335714, in which colorants with satisfactory hues and improved light fastness are disclosed. However, all the colorants known by literature have extremely insufficient fastness to oxidizing gases such as ozone.

To develop a dye fast to oxidizing gases such as ozone, the present inventors have reached an idea of using nitrogen-containing heterocyclic compounds as a coupler in place of the related couplers, such as phenols, naphthols, and anilines. Azo dyes prepared from aminopyrazolediazo components and aniline couplers that have hitherto been proposed are disclosed, e.g., in JP-A-55-161856, JP-A-61-36362, JP-A-61-152768, JP-A-6-145543, JP-A-7-224230, U.S. Pat. Nos. 4,650,861 and 4,301,070, and JP-T-11-504958. However, all of them fail to satisfy both hue and various fastness properties. Azo dyes prepared using pyridine couplers are known, including those described in JP-A-51-83631, JP-A-49-74718, JP-A-58-101158, JP-B-52-46230, EP23309, and German Patents 2719079, 2307444, 2513949, 2525505, and 2832020. Azo dyes prepared from pyrazolediazo components and pyridine couplers are proposed in JP-A-2002-371079, WO02/83662. and WO02/83795, which have been proved to have fairly improved fastness to ozone and light but still leave room for further improvement.

SUMMARY OF THE INVENTION

An object of the present invention is to provide solutions to the above-described problems associated with related techniques. That is, an object of the invention is to provide:

(1) an azo dye having a specific structure and useful as an intermediate of organic compounds for chemical, pharmaceutical and agricultural applications, (2) a novel dye having absorption characteristics allowing for favorable color reproduction of three primary colors and sufficient colorfastness to light, heat, humidity, and environmental active gases and a process of producing the dye, (3) various coloring compositions providing color images and coloring materials excellent in hue and fastness, including ink compositions for printing, such as ink jet printing, ink sheets of thermal transfer image recording materials, electrophotographic toners, coloring materials for color filters used in displays, e.g., LCDs and PDPs, and image sensors, e.g., CCDs, and dye baths for various fibers, and (4) ink jet ink containing the novel dye providing color images with good hues and high colorfastness to light and environmental active gases, particularly ozone gas, ink cartridge comprising the ink and ink jet printer comprising the ink cartridge.

The present inventors have conducted extensive and intensive researches in pursuit of a dye derivative that has a satisfactory hue and high colorfastness and, as a result, found that the above objects are accomplished by a novel azo dye having a specific skeleton.

That is, according to the invention, the above objects of the invention are achieved by the following azo dye, the process of producing the same and coloring composition containing the azo dye.

(1) An azo dye represented by formula (I):

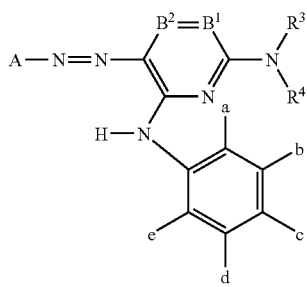

Formula (I)

wherein A represents a residue of a 5-membered heterocyclic diazo component A-NH$_2$;

B$^1$ and B$^2$ each represents =CR$_1$— or =CR$_2$—, or one of B$^1$ and B$^2$ represents a nitrogen atom and the other of B$^1$ and B$^2$ represents =CR$_1$— or =CR$_2$—;

R$^3$ and R$^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of the groups may have a substituent;

R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, an ureido group, a sulfamoylamino group, an alkoxycarbonylamino group, an aryloxycarbonylamino group, an alkylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group, each of the groups may have a substituent, and R$^1$ and R$^3$ may be taken together, or R$^3$ and R$^4$ maybe taken together, each to form a 5-or 6-membered ring;

a and e each independently represents an alkyl group, an alkoxy group or a halogen atom, and when a and e each represents an alkyl group, alkyl groups represented by a and e have at least three carbon atoms in total that constitute the alkyl groups, and each of the groups may have a substituent;

b, c, and d each independently has a same meaning as R$^1$ and R$^2$, and a and b may be taken together, or e and d may be taken together, each to form a condensed ring; and formula (I) has at least one ionic hydrophilic group.

(2) The azo dye as described in (1) above, which is represented by formula (II):

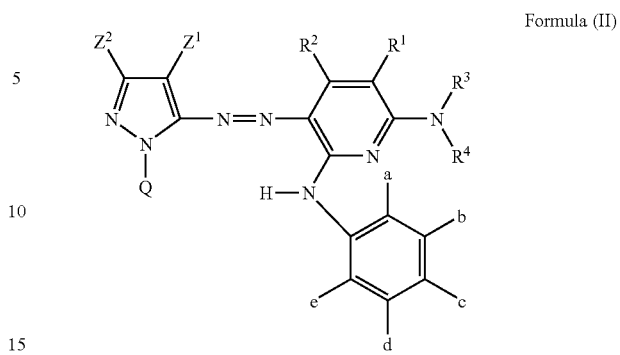

Formula (II)

wherein each of R$^1$, R$^2$, R$^3$, R$^4$, a, b, c, d, and e is the same as defined in formula (I);

Z$^1$ represents an electron attracting group having a Hammett substituent constant op of 0.20 or more;

Z2 represents a hydrogen atom, an aliphatic group, an aromatic group or a heterocyclic group;

Q represents a hydrogen atom, an aliphatic group, an aromatic group or a heterocyclic group, and each of the groups represented by Z$^1$, Z$^2$, and Q may have a substituent; and formula (II) has at least one ionic hydrophilic group.

(3) The azo dye as described in (1) or (2) above,
wherein the at least one ionic hydrophilic group contains a sulfo group.

(4) The azo dye as described in (3) above,
wherein the sulfo group has a counter ion, and
wherein the counter ion is a lithium ion.

(5) An ink jet recording ink comprising at least one azo dye as described in any of (1) to (4) above.

(6) A heat sensitive recording material comprising at least one azo dye as described in any of (1) to (4) above.

(7) A color toner comprising at least one azo dye as described in any of (1) to (4) above.

(8) A color filter comprising at least one azo dye as described in any of (1) to (4) above.

(9) An ink jet recording method, which comprises forming an image with an ink jet recording ink as described in (5) above on an image receiving material comprising a substrate and an ink receiving layer containing an inorganic white pigment.

(10) An ink cartridge comprising an ink jet recording ink as described in (5) above.

(11) An ink jet printer comprising an ink cartridge as described in (10) above.

(12) A process of producing a compound represented by formula (II) as described in (2) above, the process comprising:

(a) allowing an aminopyrazole represented by formula (III) to react with a diazotizing agent to form a diazonium salt;

(b) allowing the diazonium salt to react with a coupling agent represented by formula (IV) to form a compound represented by formula (II-Hl); and (c) allowing the compound represented by formula (II-H1) to react with an alkylating agent, an arylating agent or a heterylating agent in a presence of a base to form a compound represented by formula (II-R1) (preferably formula (II-R2)):

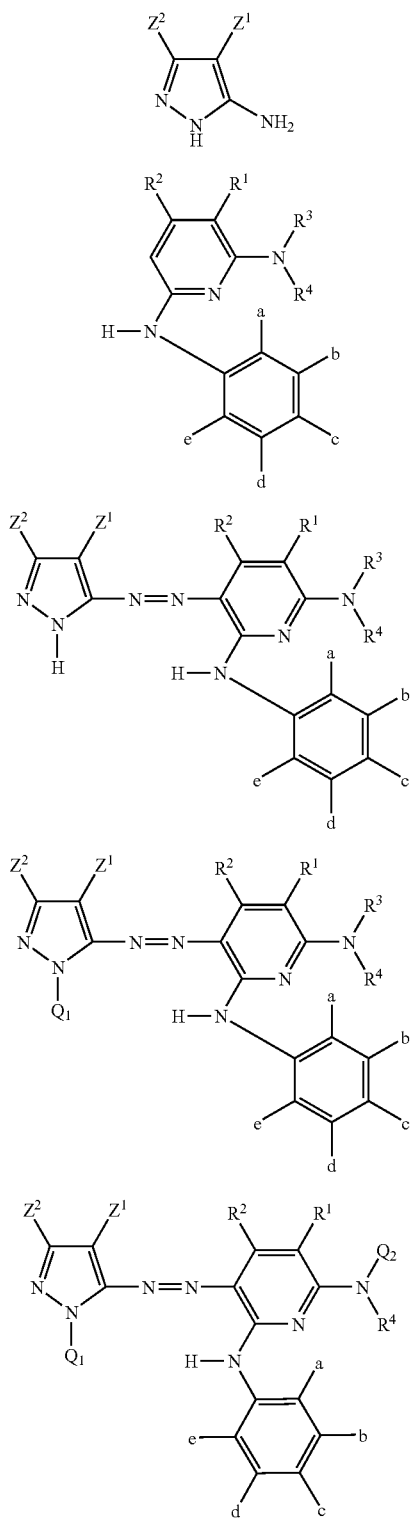

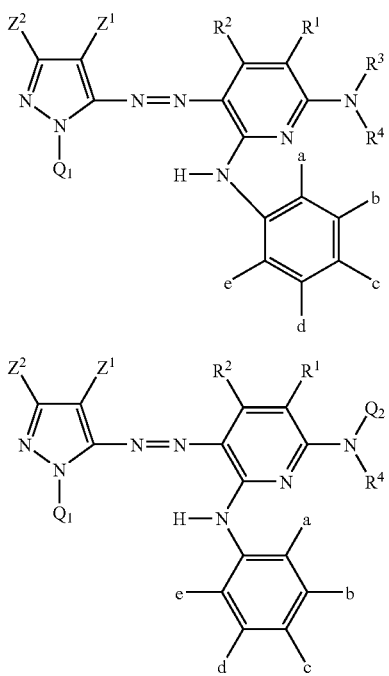

wherein each of $Z^1$, $Z^2$, $R^3$, $R^4$, a, b, c, d, and e is the same as defined in formula (II); and $Q_1$ and $Q_2$, which may be the same or different, each independently represents an aliphatic group, an aromatic group or a heterocyclic group. (13) A process of producing a compound represented by formula (II) as described in (2) above, the process comprising:

introducing a water soluble group into a compound represented by formula (II-R1) or formula (II-R2) by an electrophilic reaction, wherein each of $Z^1$, $Z^2$, $R^3$, $R^4$, a, b, c, d, and e is the same as defined in formula (II); and $Q_1$ and $Q_2$, which may be the same or different, each independently represents an aliphatic group, an aromatic group or a heterocyclic group.

DETAILED DESCRIPTION OF THE INVENTION

The embodiments of the examples of the present invention are described in detail below.

Azo Dye

In the azo dye (compound) represented by formula (I), A is a residue of a 5-membered heterocyclic diazo component represented by A-NH$_2$. The hetero atom of the 5-membered heterocyclic ring includes nitrogen, oxygen, and sulfur. Nitrogen containing 5-membered heterocyclic ring is preferred. The 5-membered heterocyclic ring may have an aliphatic ring, an aromatic ring or another heterocyclic ring condensed thereto.

Preferred examples of the heterocyclic rings as A include a pyrazole ring, an imidazole ring, a triazole ring, a thiazole ring, an isothiazole ring, a thiadiazole ring, a benzothiazole ring, a benzoxazole ring, and a benzisothiazole ring. These heterocyclic groups may have a substituent. Of the recited heterocyclic rings, a pyrazole ring represented by formula (a), an isothiazole ring represented by formula (b), a thiadiazole ring represented by formula (c) or (d), a benzothiazole ring represented by formula (e), an imidazole ring-represented by formula (f), and a triazole ring represented by formula (g) are preferred.

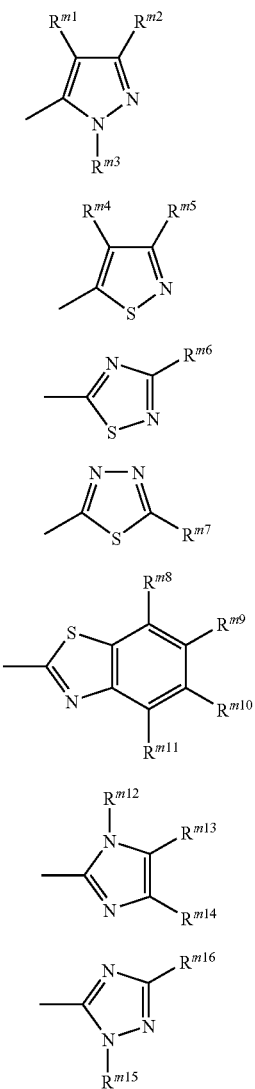

Formula (a)
(b)
(c)
(d)
(e)
(f)
(g)

wherein $R^{m1}, R^{m2}, R^{m3}, R^{m4}, R^{m5}, R^{m6}, R^{m7}, R^{m8}, R^{m9}, R^{m10}, R^{m11}, R^{12}, R^{m13}, R^{m14}, R^{m15}$, and $R^{m16}$ each has the same meaning as $R^1$ and $R^2$ in formula (I).

$R^3$ and $R^4$ each independently represents a hydrogen atom, an aliphatic group (including a substituted or unsubstituted alkyl group, a substituted or unsubstituted alkenyl group, and a substituted or unsubstituted alkynyl group), an aromatic group (including a substituted or unsubstituted phenyl group and a substituted or unsubstituted naphthyl group), a heterocyclic group, an acyl group, an alkoxycarbonyl group, an aryloxycarbonyl group, a carbamoyl group, a sulfonyl group (inclusive of an alkylsulfonyl group and an arylsulfonyl group) or a sulfamoyl group, preferably a hydrogen atom, an alkyl group, a cycloalkyl group, an aralkyl group, an alkenyl group, an aryl group, a heterocyclic group, a sulfonyl group, an acyl group or a carbamoyl group, and each of which may have a substituent.

$B^1$ and $B^2$ each represents —$CR^1$= or —$CR^2$=, or one of them represents a nitrogen atom and the other of them represents —$CR^1$= or —$CR^2$=. It is preferred for $B^1$ and $B^2$ each represents =$CR_1$— or =$CR_2$— for obtaining more excellent performance.

$R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group. Each of these group may have a substituent. $R^1$ and $R^3$ may be taken together, or $R^3$ and $R^4$ may be taken together, each to form a 5- or 6-membered ring.

a and e each independently represents an alkyl group, an alkoxy group or a halogen atom, provided that, when a and e both represent an alkyl group, the total number of the carbon atoms in the two alkyl moieties is at least three. The alkyl group and the alkoxy group as a and e may have a substituent. b, c, and d each has the same meaning as $R^1$ and $R^2$. a and b may be taken together, or e and d may be taken together, each to form a condensed ring.

The formula (I) contains at least one ionic hydrophilic group.

Of the compounds of formula (I), those represented by formula (II) are preferred.

In formula (II), $Z^1$ represents an electron attracting group having a Hammett substituent constant σp of 0.20 or more, preferably 0.30 or more. The Hammett substituent constant σp as a higher limit is preferably 1.0 or less.

Examples of electron attracting groups whose Hammett substituent constant σp is 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with another electron attracting group having a σp value of 0.20 or more.

$Z^1$ represents preferably a cyano group, a nitro group, or a halogen atom. A halogen atom and a cyano group are still preferred. A cyano group is particularly preferred.

$Z^2$ represents a hydrogen atom, an aliphatic group, an aromatic group or a heterocyclic group. $Z^2$ is preferably a hydrogen atom, an alkyl group, a cycloalkyl group, an aralkyl group, an aryl group, a heterocyclic group or an acyl group, still preferably an alkyl group. The groups recited as $Z^2$ may have a substituent.

The term "alkyl group" includes an unsubstituted alkyl group and an alkyl group having a substituent. The number of the carbon atoms in the alkyl group except in the substituent is preferably 1 to 12, still preferably 1 to 6. Examples of the substituent include a hydroxyl group, an alkoxy group, a cyano group, a halogen atom, and an ionic hydrophilic group.

Examples of the alkyl group are methyl, ethyl, butyl, isopropyl, t-butyl, hydroxyethyl, methoxyethyl, cyanoethyl, trifluoromethyl, 3-sulfopropyl, and 4-sulfobutyl.

The term "cycloalkyl group" includes an unsubstituted cycloalkyl group and a cycloalkyl group having a substituent. The number of the carbon atoms in the cycloalkyl group except in the substituent is preferably 5 to 12. The substituent includes an ionic hydrophilic group. Examples of the cycloalkyl group include a cyclohexyl group.

The term "aralkyl group" includes an unsubstituted aralkyl group and an aralkyl group having a substituent. The number of the carbon atoms in the aralkyl group except in the substituent is preferably 7 to 12. The substituent includes an ionic hydrophilic group. Examples of the aralkyl group include benzyl and 2-phenethyl.

The term "aryl group" includes an unsubstituted aryl group and an aryl group having a substituent. The number of carbon atoms in the aryl group except in the substituent is preferably 6 to 12. Examples of the substituent include an alkyl group, an alkoxy group, a halogen atom, an alkylamino group, an amide group, a carbamoyl group, a sulfamoyl group, a sulfonamide group, a hydroxyl group, an ester group, and an ionic hydrophilic group. Examples of the aryl group are phenyl, p-tolyl, p-methoxyphenyl, o-chlorophenyl, and m-(3-sulfopropylamino)phenyl.

The term "heterocyclic group" includes an unsubstituted heterocyclic group and a heterocyclic group having a substituent. The heterocyclic group is preferably 5-membered or 6-membered. Examples of the substituent are an amide group, a carbamoyl group, a sulfamoyl group, a sulfonamide group, a hydroxyl group, an ester group, and an ionic hydrophilic group. Examples of the heterocyclic group include 2-pyridyl, 2-thienyl, 2-thiazolyl, 2-benzothiazolyl, and 2-furyl.

The term "acyl group" includes an unsubstituted acyl group and an acyl group having a substituent. The number of carbon atoms in the acyl group except in the substituent is preferably 1 to 12. The substituent includes an ionic hydrophilic group. Examples of the acyl group include acetyl and benzoyl.

The term "alkenyl group" includes an unsubstituted alkenyl group and an alkenyl group having a substituent. The number of the carbon atoms in the alkenyl group except in the substituent is preferably 5 to 12. The substituent includes an ionic hydrophilic group. Examples of the alkenyl group include vinyl and allyl.

The term "sulfonyl group" includes an alkylsulfonyl group, e.g., a methanesulfonyl group, and an arylsulfonyl group, e.g., a phenylsulfonyl group.

$R^3$ and $R^4$ do not simultaneously represent a hydrogen atom.

Q represents a hydrogen atom, an aliphatic group, an aromatic group or a heterocyclic group. $Q^1$ and $Q_2$ each represents an aliphatic group, an aromatic group or a heterocyclic group. $Q_1$ and $Q_2$ each preferably represent an alkyl group, a cycloalkyl group, an aralkyl group, an alkenyl group, an aryl group or a heterocyclic group, each of which may have a substituent. The details of these groups are the same as those described for $R^1$ and $R^2$.

Q, $Q_1$, and $Q_2$ are preferably an aryl or heterocyclic group substituted with an electron attracting group.

A Hammett substituent constant up is briefly explained below. The Hammett's rule is an empirical rule proposed by L. P. Hammett in 1935 in an attempt to quantitatively discuss the influences of a substituent of a benzene derivative on the reaction or equilibrium, the validity of which is now generally admitted. Substituent constants obtained by the Hammett's rule include σp and σm values. These values are found in many general books, for example, J. A. Dean (ed.), *Lange's Handbook of Chemistry*, the 12th Ed., MacGraw-Hill (1979) and *Kagakuno Ryoiki*, Extra No. 122, Nankodo (1979), 96-103. In the present invention, various substituents have been and will be limited or described in terms of Hammett substituent constants σp. This does not mean that intended substituents are limited to those substituents the up value of which is known from literature, and intended substituents include any substituent of which the σp value is not found in literature but seems to fall within a recited range when measured based on Hammett's rule.

The above described electron attracting groups as Q, $Q_1$, and $Q_2$ are a Hammett substituent constant σp of 0.20 or more, preferably 0.30 or more. The σp as a higher limit is preferably 1.0 or less.

Examples of the electron attracting groups having a Hammett substituent constant σp of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, a heterocyclic group, a halogen atom, an azo group, a selenocyanate group, and an aryl group substituted with another electron attracting group having a σp value of 0.20 or more, preferably a cyano group, a nitro group and a halogen atom. The heterocyclic group may or may not be substituted with an electron attracting group.

Preferred combinations of the substituents in formula (I) are as follows. The preferred combination is a case wherein A is a pyrazole ring, an imidazole ring, an isothiazole ring, a thiadiazole ring or a benzothiazole ring, particularly a pyrazole ring; $B^1$ is an unsubstituted carbon atom, and $B^2$ is an unsubstituted carbon atom or an alkyl-substituted carbon atom; $R^3$ and $R^4$ are each selected from a hydrogen atom, an alkyl group, an aralkyl group, an aryl group, a heterocyclic group, a sulfonyl group, and an acyl group; and a and e are each preferably an alkyl group or a halogen atom, wherein both of a and e are an alkyl group, they are unsubstituted alkyl groups having at least 3, preferably 5 or fewer, carbon atoms in total, and a, b, c, and d are each selected from a hydrogen atom, a halogen atom, an alkyl group, and an ionic hydrophilic group, preferably selected from a hydrogen atom, an alkyl group having 1 to 4 carbon atoms, and an ionic hydrophilic group.

Of the compounds represented by formula (I), those of formula (II) are most preferred. In formula (II), $Z^1$ is particularly preferably a cyano group. $Z^2$ is preferably an alkyl group or an aryl group. The alkyl group is preferably one having 3 or 4 carbon atoms, still preferably isopropyl or t-butyl. The aryl group is preferably a phenyl group or a phenyl group having a substituent at the 2-, 4- or 6-position with respect to the pyrazole nucleus.

Preferred combinations of the substituents in formula (II) areas follows. The preferred combination is a case wherein $Z^1$ is a cyano group; $Z^2$ is an isopropyl group, a t-butyl group or a phenyl group, preferably a t-butyl group; $R^1$ is a hydrogen atom; $R^2$ is a hydrogen atom or an alkyl group having 1 to 4 carbon atoms, preferably a methyl group; $R^3$ and $R^4$ are each a hydrogen atom, an alkyl group, an aralkyl group, an aryl group, a heterocyclic group, a sulfonyl group or an acyl group, preferably a hydrogen atom, a heterocyclic group (preferably a benzoxazole ring or a benzothiazole ring, still preferably a sulfo-substituted or unsubstituted benzothiazole ring)) or a phenyl group substituted with an alkyl group and/or a sulfo group; a and e are each a substituted or unsubstituted alkyl group, having at least 3 carbon atoms (preferably 5 or fewer) in total a+e, preferably each an unsubstituted alkyl group, having 4 or 5 carbon atoms in total a+e; b, c, and d are each a hydrogen atom, a halogen atom, an alkyl group or an ionic hydrophilic group, preferably a hydrogen atom, an alkyl group having 1 to 4 carbon atoms or a sulfo group; and Q, $Q_1$, and $Q_2$ are each a heterocyclic group, preferably a benzoxazole ring or a benzothiazole ring, still preferably a sulfamoyl- or sulfo-substituted, benzoxazole or benzothiazole ring.

The azo dye represented by formula (I) and formula (II) contains at least one, preferably 3 to 6, ionic hydrophilic groups. The ionic hydrophilic groups include a sulfo group, a carboxyl group, a phosphono group, and a quaternary ammonium group, preferably a carboxyl group, a phosphono group, and a sulfo group, still preferably a carboxyl group and a sulfo group. It is particularly preferred that the compound have at least one sulfo group. The carboxyl, phosphono, and sulfo groups can be in the form of a salt. In that case, the counter ions includes an ammonium ion, alkali metal ion (e.g., lithium ion, sodium ion and potassium ion), and organic cation (e.g., tetramethylammonium ion, tetramethylguanidinium ion or tetramethylphosphonium ion). Among counter ions alkali metal salts are preferred. Of the alkali metal salts, a potassium ion, sodium ion and lithium ion are more preferred, and a lithium ion is most preferred. In particular, from the viewpoint of the improvement of solubility and inhibition of a bronzing phenomenon in ink jet printing, the combination of a sulfo group as the ionic hydrophilic group and a lithium ion as the counter ion thereof is most preferred.

The above-described azo dye preferably contains 3 to 6 ionic hydrophilic groups in the molecule, more preferably 3 to 6 sulfo groups. It is still preferred for the compound to contain 3 to 5 sulfo groups per molecule.

Process of Producing Azo Dye

Hereinafter, the process of producing the compounds represented by formula (II-R1) or (II-R2) is described. The compound represented by formula (II-R1) is obtained by any one of the following processes 1 and/or 2.

Process 1 includes the steps of:
(a) allowing an aminopyrazole represented by formula (III) to react with a diazotizing agent to form a diazonium salt;
(b) allowing the diazonium salt from the step (a) to react with a coupling agent represented by formula (IV) to form a compound represented by formula (II-H1); and
(c) allowing the compound from the step (b) to react with an alkylating agent, an arylating agent or a heterylating agent in the presence of a base to form a compound represented by formula (II-R1).

Process 2 includes the step of introducing a water soluble group into the compound represented by formula (II-R1) through electrophilic reaction. A preferred method for carrying out the electrophilic reaction will be described infra.

The diazotizing agent that can be used in step (a) of process 1 preferably includes a solution of sodium nitrite in diluted hydrochloric acid. Isopentyl nitrite and nitrosylsulfuric acid are also useful as a diazotizing agent.

In step (b) of process 1, a nitrogen-containing 6-membered heterocyclic coupler represented by formula (IV) is used as a coupling agent. In formula (IV), preferred examples of $Z^1$, $Z^2$, $R^1$, $R^2$, $R^3$, $R^4$, a, b, c, d, and e are the same as described with respect to formula (II).

The alkylating agent, arylating agent and heterylating agent that can be used in step (c) of process 1 are represented by the following formulae (V), (VI), and (VII), respectively.

  Formula (V)

  Formula (VI)

  Formula (VII)

wherein in formula (V), R represents a substituted or unsubstituted alkyl group; and X represents a halogen atom or $OSO_2R'$, wherein R' represents an alkyl group or an aryl group such as phenyl group etc.;

in formula (VI), Ar represents a phenyl group substituted with an electron attracting group, preferably an electron attracting group having a Hammett substituent constant σp of 0.2 or more; and in formula (VII), Het represents a heterocyclic group, preferably 2-pyridyl, 2-thienyl, 2-thiazolyl, 2-benzothiazolyl, triazyl or 2-furyl.

The base that can be used in step (c) includes organic bases, such as diisopropylethylamine, and inorganic bases, such as potassium carbonate, sodium carbonate, sodium hydrogencarbonate, potassium hydrogencarbonate, sodium hydroxide, and potassium hydroxide.

The electrophilic reaction used in process 2 includes sulfonation, Mannich reaction, and Friedel-Crafts reaction. Sulfonation is preferred.

Sulfonation of the compound of formula (II-R1) is carried out using a sulfonating agent, such as concentrated sulfuric acid, 10% to 60% fuming sulfuric acid, chlorosulfonic acid, sulfur trioxide or amidosulfuric acid. Solvents that may be used if desired include acetic acid, acetic anhydride, sulfolane, ethyl acetate, ether, carbon tetrachloride, and acetonitrile.

It is desirable that the sulfonation of the compound of formula (II-R1) result in sulfonation of $Q_1$, $R^3$, $R^4$, b(d), and c. Where the compound of formula (II-R1) to be sulfonated has a plurality of reactive sites subject to sulfonation, e.g., at $Q_1$, $R^3$, $R^4$, b(d), and c, the sulfonation product may be a mixture of sulfonated compounds having sulfo groups introduced into different sites. In such cases, it is acceptable that the sulfonation product consists of a major sulfonated dye and 0.1% to 50%, in terms of a peak area ratio in HPLC, of other sulfonated dyes having a sulfo group(s) introduced into a site(s) different from the sites in the major sulfonated dye. The reaction temperature preferably ranges from −5° to 80° C., still preferably 10° to 70° C. The reaction time preferably ranges from 0.5 to 10 hours, still preferably 1 to 6 hours.

In the process of producing the compound represented by formula (II-R1) or (II-R2), as the above-mentioned oxygen-free condition, it is desired to produce with purging the reaction system with an inert gas, such as nitrogen or argon. Preferably, the reaction mixture is bubbled with an inert gas.

The aminopyrazole of formula (III), the starting material of step (a) in process 1, can be synthesized by known processes described, e.g., in U.S. Pat. No. 3,336,285, JP-B-6-19036, and *Heterocycles,* 20, 519 (1983).

The pyridine coupler of formula (IV) used in step (b) in Process 1 can be synthesized by known processes described, e.g., in JP-A-51-83631, JP-A-49-74718, and JP-B-52-46230.

The azo dyes represented by formula (II) can be synthesized by the aforementioned processes of the invention. Specific examples of the azo dyes according to the present invention are shown below, but not limited thereto.

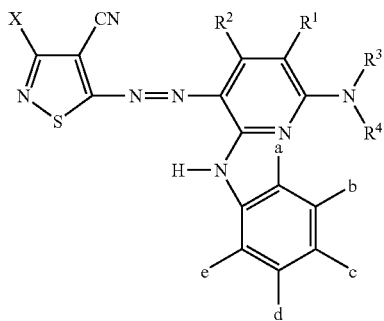

| Compound | X | R¹ | R² | R³ | R⁴ | a | b | c | d | e |
|---|---|---|---|---|---|---|---|---|---|---|
| a-1 | $CH_3$ | CN | $CH_3$ | H | 3-methylphenyl-SO₃H | $CH_3$ | H | $SO_3H$ | H | $C_2H_5$ |
| a-2 | " | $CONH_2$ | H | " | 3,5-diisopropyl-4-methylphenyl-SO₃H | iPr | " | " | " | iPr |
| a-3 | " | H | $CH_3$ | 2-methylbenzothiazol-6-yl-SO₃H | 3,5-diisopropyl-4-methylphenyl-SO₃H | " | " | " | " | " |
| a-4 | " | " | " | 2-methylbenzothiazol-6-yl-SO₃H | 3,5-diethyl-4-methylphenyl-SO₃H | $C_2H_5$ | " | " | " | $C_2H_5$ |
| a-5 | " | " | " | 2-methylbenzothiazol-6-yl-SO₃H | 2,4-diethyl-3,6-dimethylphenyl-SO₃H | " | " | $CH_3$ | $SO_3H$ | " |

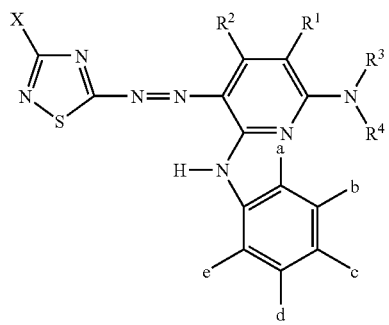

| Compound | X | R¹ | R² | R³ | R⁴ | a | b | c | d | e |
|---|---|---|---|---|---|---|---|---|---|---|
| b-1 | —SCH₃ | CN | CH₃ | H | 3-sulfophenyl-methyl (m-CH₃-C₆H₄-SO₃H) | CH₃ | H | SO₃H | H | C₂H₅ |
| b-2 | —S-CH₂CH₂-SO₃H | CONH₂ | H | " | 3,5-diisopropyl-4-methylphenyl-SO₃H | iPr | " | " | " | iPr |
| b-3 | 3-methylphenyl-SO₃H | H | CH₃ | 2-methylbenzothiazol-6-yl-SO₃H | 3,5-diisopropyl-4-methylphenyl-SO₃H | " | " | " | " | " |
| b-4 | —S-CH₂CH₂-SO₃H | " | " | 2-methylbenzothiazol-6-yl-SO₃H | 3,5-diethyl-4-methylphenyl-SO₃H | C₂H₅ | " | " | " | C₂H₅ |
| b-5 | —SCH₃ | " | " | 2-methylbenzothiazol-6-yl-SO₃H | 2,4-diethyl-3,6-dimethylphenyl-SO₃H | " | " | CH₃ | SO₃H | " |

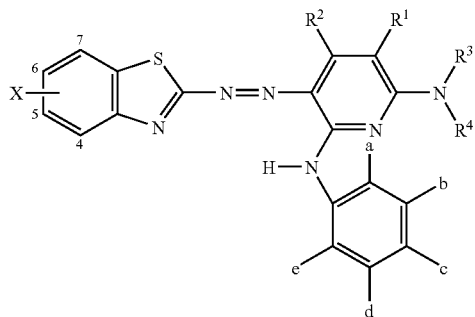

| Compound | X | R¹ | R² | R³ | R⁴ | a | b | c | d | e |
|---|---|---|---|---|---|---|---|---|---|---|
| c-1 | 5-Cl | CN | CH₃ | H | 3-sulfophenyl (m-C₆H₄SO₃H) | CH₃ | H | SO₃H | H | C₂H₅ |
| c-2 | 5,6-diCl | CONH₂ | H | " | 3,5-diisopropyl-4-methylphenyl-SO₃H | iPr | " | " | " | iPr |
| c-3 | 5-CH₃ | H | CH₃ | 2-methylbenzothiazol-6-yl-SO₃H | 3,5-diisopropyl-4-methylphenyl-SO₃H | " | " | " | " | " |
| c-4 | 6-Cl | " | " | 2-methylbenzothiazol-6-yl-SO₃H | 3,5-diethyl-4-methylphenyl-SO₃H | C₂H₅ | " | " | " | C₂H₅ |
| c-5 | 5,6-diCl | " | " | 2-methylbenzothiazol-6-yl-SO₃H | 3,5-diethyl-4-methyl-2-sulfophenyl | " | " | CH₃ | SO₃H | " |

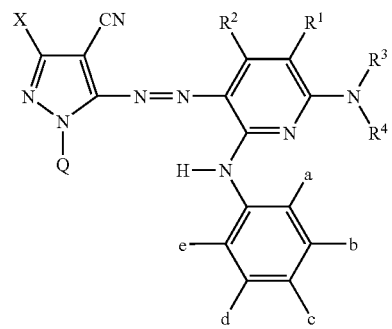

| Compound | X | Q | R¹ | R² | R³ | R⁴ |
|---|---|---|---|---|---|---|
| d-1 | phenyl (p-tolyl) | 2-methylbenzothiazole-6-SO₃H | CN | CH₃ | H | p-tolyl-SO₃H |
| d-2 | t-Bu | 2-methylbenzothiazole-6-SO₃H | CONH₂ | H | " | 3,5-diisopropyl-4-methylphenyl-SO₃H |
| d-3 | " | 2-methylbenzothiazole-6-SO₃H | H | CH₃ | 2-methylbenzothiazole-6-SO₃H | 3,5-diisopropyl-4-methylphenyl-SO₃H |
| d-4 | " | 2-methylbenzothiazole-6-SO₃H | " | " | 2-methylbenzothiazole-6-SO₃H | 3,5-diethyl-4-methylphenyl-SO₃H |
| d-5 | " | 2-methylbenzothiazole-6-SO₃H | " | " | 2-methylbenzothiazole-6-SO₃H | 2,4-diethyl-3,6-dimethylphenyl-SO₃H |

| Compound | a | b | c | d | e |
|---|---|---|---|---|---|
| d-1 | CH₃ | H | SO₃H | H | C₂H₅ |
| d-2 | iPr | " | " | " | iPr |
| d-3 | " | " | " | " | " |
| d-4 | C₂H₅ | " | " | " | C₂H₅ |
| d-5 | " | " | CH₃ | SO₃H | " |

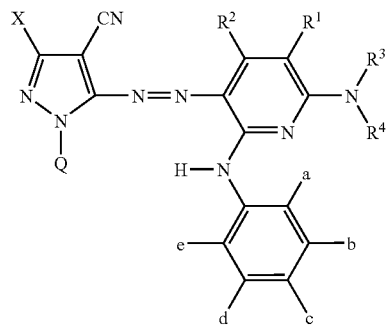

| Compound | X | Q | R¹ | R² | R³ |
|---|---|---|---|---|---|
| d-6 | t-Bu | 2-methylbenzothiazole-6-SO₃H | H | CH₃ | 2-methylbenzothiazole-6-SO₃H |
| d-7 | " | 2-methylbenzothiazole-6-SO₃H | " | " | 2-methylbenzothiazole-6-SO₃H |
| d-8 | " | 2-methylbenzothiazole-6-SO₃H | " | " | 2-methylbenzothiazole-6-SO₃H |
| d-9 | " | 2-methylbenzothiazole-6-SO₂NH-(3,5-di-COOH-phenyl) | " | " | 2-methylbenzothiazole-6-SO₂NH-(3,5-di-COOH-phenyl) |
| d-10 | " | 2-methylbenzothiazole-6-SO₂NH-(3,5-di-COOH-phenyl) | " | " | 2-methylbenzothiazole-6-SO₂NH-(3,5-di-COOH-phenyl) |

| Compound | R⁴ | a | b | c | d | e |
|---|---|---|---|---|---|---|
| d-6 | 3,4-dimethyl-5-isopropyl-phenyl-SO₃H | CH₃ | H | SO₃H | H | iPr |
| d-7 | 3-methoxy-4,5-dimethyl-phenyl-SO₃H | " | " | " | " | OCH₃ |

-continued
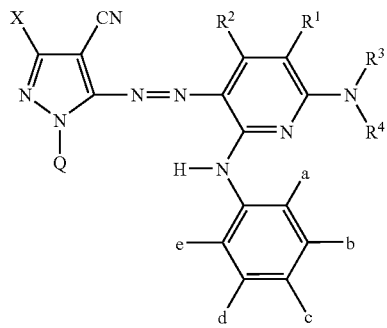
| Compound | (structure) | | | | |
|---|---|---|---|---|---|
| d-8 | ![3-Cl-2,4,6-trimethyl-5-SO3H phenyl] | " | " | CH₃ | SO₃H | Cl |
| d-9 | ![2,4-diethyl-3-SO3H-6-methyl phenyl] | C₂H₅ | " | " | " | C₂H₅ |
| d-10 | ![3,5-diisopropyl-4-methyl-SO3H phenyl] | iPr | " | SO₃H | " | iPr |
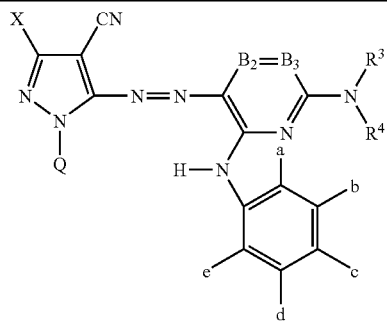
| Compound | Q | B₁ | B₂ | R³ | R⁴ |
|---|---|---|---|---|---|
| d-11 | ![2-methyl-benzoxazole-6-SO3H] | N | C—CH₃ | H | ![2,4-diethyl-3-methyl-6-SO3H phenyl] |

-continued
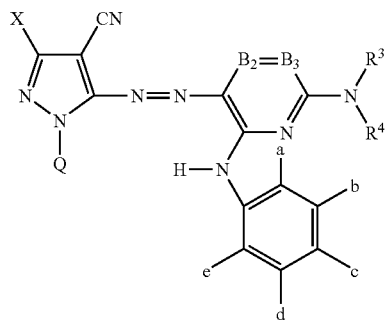
| | | | | | |
|---|---|---|---|---|---|
| d-12 | 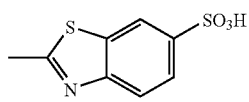 | " | C—NHCCH₃<br>‖<br>O | " | 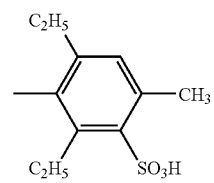 |
| d-13 | 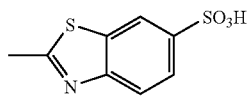 | C—H | N | " | 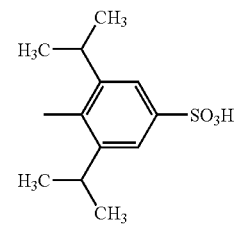 |
| d-14 | 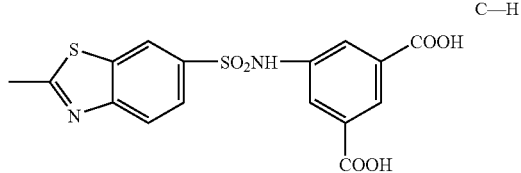 | C—H | N | " | 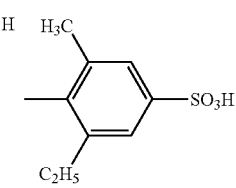 |
| d-15 | 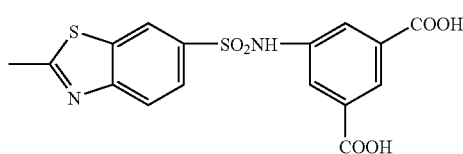 | N | C—NHCCH₃<br>‖<br>O | 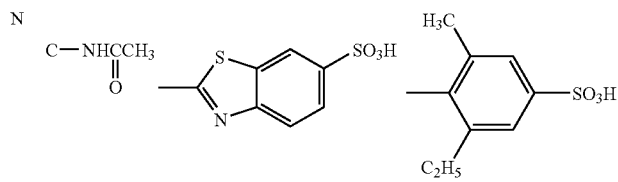 | |
| Compound | a | b | c | d | e |
|---|---|---|---|---|---|
| d-11 | C₂H₅ | H | CH₃ | SO₃H | C₂H₅ |
| d-12 | " | " | " | " | " |
| d-13 | iPr | " | SO₃H | H | iPr |
| d-14 | CH₃ | " | " | " | C₂H₅ |
| d-15 | " | " | " | " | " |

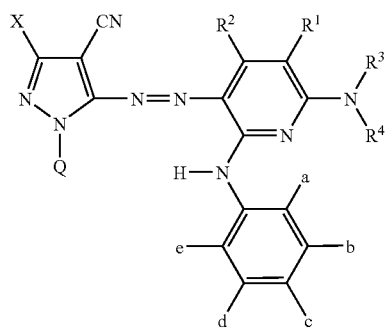

| Compound | X | Q | R¹ | R² | R³ | R⁴ | a | b | c | d | e |
|---|---|---|---|---|---|---|---|---|---|---|---|
| d-16 | t-Bu | 2-methylbenzothiazole-5-SO₃H | H | CH₃ | 2-methylbenzothiazole-5-SO₃H | 3-SO₃H-2,6-diethyl-4-methylphenyl (C₂H₅, CH₃, C₂H₅, SO₃H) | C₂H₅ | H | CH₃ | SO₃H | C₂H₅ |
| d-17 | " | 2-methylbenzothiazole-6-SO₃H | " | " | 2-methylbenzothiazole-6-SO₃H | 2,6-diethyl-4-methylphenyl | " | " | " | " | " |
| d-18 | " | 2-methylbenzothiazole-6-SO₃H | " | " | 2-methylbenzothiazole-4,6-diSO₃H | 3-SO₃H-2,6-diethyl-4-methylphenyl | " | " | " | " | " |
| d-19 | " | 2-methylbenzoxazole-6-SO₃H | " | " | 2-methylbenzoxazole-6-SO₃H | 3-SO₃H-2,6-diethyl-4-methylphenyl | " | " | " | " | " |
| d-20 | " | 2-methylbenzothiazole | " | " | 2-methylbenzothiazole | 3-SO₃H-2,6-diethyl-4-methylphenyl | " | " | " | " | " |

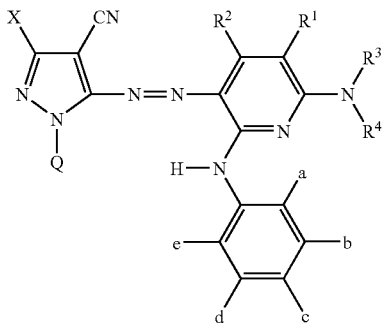

| Compound | X | Q | R¹ | R² | R³ | R⁴ | a | b | c | d | e |
|---|---|---|---|---|---|---|---|---|---|---|---|
| d-21 | t-Bu | 2-methylbenzothiazol-6-yl-SO₃H | CN | CH₃ | 2-methylbenzothiazol-6-yl | C₂H₅ / 3,5-diethyl-4-methyl-phenyl-SO₃H with CH₃ | C₂H₅ | H | CH₃ | SO₃H | C₂H₅ |
| d-22 | " | " | " | " | " | C₂H₅ / 3,5-diethyl-4-methylphenyl | " | " | " | " | " |
| d-23 | " | " | " | " | 2-methylbenzothiazol-6-yl-SO₃H, 4-SO₃H | C₂H₅ / 3,5-diethyl-4-methyl-phenyl-SO₃H | " | " | " | " | " |
| d-24 | " | " | " | " | " | C₂H₅ / 3,5-diethyl-4-methyl-phenyl-SO₃H | " | SO₃H | " | " | " |
| d-25 | " | " | " | " | " | C₂H₅ / 3,5-diethyl-4-methylphenyl | " | H | " | H | " |

Applications of Azo Dye etc.

Main applications of the azo dye according to the present invention as a dye include image recording materials for forming images, especially color images, such as ink jet recording materials, thermal transfer image recording materials (i.e., heat sensitive recording materials), pressure sensitive recording materials, recording materials by electrophotographic systems (i.e., electrophotographic toners), transfer type silver halide light-sensitive materials, printing inks, and recording pens. The azo dyes of the invention are particularly suited to such applications as ink jet recording materials, thermal transfer image recording materials, and electrophotographic recording materials, and more particularly suited to application to ink jet recording materials. In addition to the main applications, the azo dyes of the invention are also applicable to color filters used in LCDs and solid-state image sensors, such as CCDs, as described in U.S. Pat. No. 4,808, 501 and JP-A-6-35182 and dye baths for dyeing various kinds of fibers.

The azo dyes of the invention can have their physical properties, such as solubility and thermal mobility, controlled by selection of substituents in accordance with the intended use. The azo dyes of the invention can be used according to the applied system in a homogeneous solution state or a dispersed solution state such as an emulsion dispersion, or even in solid dispersion state.

Ink Jet Recording Ink

The ink jet ink of the present invention is prepared by dissolving and/or dispersing the azo dye of the invention in a lipophilic medium or an aqueous medium, preferably an aqueous medium. The ink can contain additives according to necessity provided that the effects of the invention are not affected. Useful additives include anti-drying agents (wetting agents), discoloration inhibitors, emulsion stabilizers, penetrants, ultraviolet absorbers, antiseptics, antifungals, pH adjustors, surface tension modifiers, defoaming agents, viscosity modifiers, dispersants, dispersion stabilizers, anti-corrosive agents, and chelating agents. The additives can be added directly to a water-soluble ink formulation. Where an oil-soluble dye is used in the form of dispersion, the additives are usually added to the dispersion after-preparing the dye dispersion but may be added to either an oily phase or an aqueous phase during the preparation.

Anti-drying agents are added to prevent clogging of ink jet nozzles used in ink jet recording due to ink drying.

Water-soluble organic solvents having a lower vapor pressure than water are suitable anti-drying agents. Examples of water-soluble organic solvents useful as an anti-drying agent include polyhydric alcohols, such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerol, and trimethylolpropane; lower alkyl ethers of polyhydric alcohols, such as ethylene glycol monomethyl (or ethyl) ether, diethylene glycol monomethyl(or ethyl) ether, and triethylene glycol monoethyl(or butyl) ether; heterocyclic compounds, such as 2-pyrrolidone, N-methyl-2-pyrrolidone, 1,3-dimethyl-2-imidazolidinone, and N-ethylmorpholine; sulfur-containing compounds, such as sulfolane, dimethyl sulfoxide, and 3-sulfolene; polyfunctional compounds, such as diacetone alcohol and diethanolamine; and urea derivatives. Preferred of them are polyhydric alcohols, such as glycerol and diethylene glycol. These anti-drying agents can be used either individually or as a mixture thereof. A suitable amount of the anti-drying agent in an ink formulation is 10% to 50% by weight.

Penetrants are used to accelerate ink penetration into paper. Suitable penetrants include alcohols, such as ethanol, isopropyl alcohol, butanol, di(or tri)ethylene glycol monobutyl ether, and 1,2-hexanediol, sodium laurylsulfate, sodium oleate, and nonionic surface active agents. A penetrant content of 5% to 30% by weight in the ink composition will suffice to produce satisfactory effect, and the amount of the penetrant to be added within the range not to cause blur or print-through is preferred.

Ultraviolet absorbers are used to improve image stability against light. Useful ultraviolet absorbers include the benzotriazole compounds described in JP-A-58-185677, JP-A-61-190537, JP-A-2-782, JP-A-5-197075, and JP-A-9-34057; the benzophenone compounds described in JP-A-46-2784, JP-A-5-194483, and U.S. Pat. No. 3,214,463; the cinnamic acid compounds described in JP-B-48-30492, JP-B-56-21141, and JP-A-10-88106; the triazine compounds described in JP-A-4-298503, JP-A-8-53427, JP-A-8-239368, JP-A-10-182621, and JP-T-8-501291; and the compounds disclosed in Research Disclosure No. 24239. Compounds that absorb ultraviolet light to emit fluorescence, namely fluorescent whitening agents, typified by stilbene compounds and benzoxazole compounds, are also usable.

Discoloration inhibitors are used to improve image preservability. Useful discoloration inhibitors include organic ones and metal complex ones. The organic discoloration inhibitors include hydroquinones, alkoxyphenols, dialkoxyphenols, phenols, anilines, amines, indanes, chromans, alkoxyanilines, and heterocyclic compounds. The metal complex discoloration inhibitors include nickel complexes and zinc complexes. Specific examples of useful discoloration inhibitors are given in patents referred to in Research Disclosure No. 17643, VII-I to -J, ibid No. 15162, ibid No. 18716, p. 650, left col., ibidNo. 36544, p. 527, ibidNo. 307105, p. 872, and ibid No. 15162 and JP-A-62-215272, pp. 127-137.

Antifungals that can be used include sodium dehydroacetate, sodium benzoate, sodium pyridinethione-1-oxide, ethyl p-hydroxybenzoate, and 1,2-benzisothiazolin-3-one and its salts. The antifungal is preferably added to an ink formulation in an amount of 0.02 to 1.00% by weight.

Neutralizing agents, such as organic bases and inorganic alkalis, can be used as a pH adjustor. For the purpose of improving storage stability of ink jet inks, a pH adjustor is preferably added to adjust an ink formulation to pH of 6 to 10, still preferably 7 to 10.

Surface tension modifiers that can be used in the invention include nonionic, cationic or anionic surface active agents. Ink jet inks preferably have a surface tension of 20 to 60 mN/m, still preferably 25 to 45 mN/m, and a viscosity of 30 mN/m or less, still preferably 20 mN/m or less. Examples of suitable anionic surface active agents are fatty acid salts, alkylsulfates, alkylbenzenesulfonates, alkylnaphthalenesulfonates, dialkylsulfosuccinates, alkylphosphates, naphthalenesulfonic acid-formalin condensates, and polyethylene glycol alkylsulfates. Examples of suitable nonionic surface active agents are polyethylene glycol alkyl ethers, polyethylene glycol alkyl allyl ethers, polyethylene glycol fatty acid esters, sorbitan fatty acid esters, polyoxyethylene sorbitan fatty acid esters, polyoxyethylene alkylamines, glycerol fatty acid esters, and ethylene oxide/propylene oxide block copolymers. A series of acetylenic polyethylene oxide surfactants available from Air Products & Chemicals, Inc. under the trade name Surfynol are also preferably used. Amphoteric surface active agents of amine oxide type, such as N,N-dimethyl-N-alkylamine oxides, are preferred as well. Additionally the surface active agents described in JP-A-59-157636, pp. 37-38 and Research Disclosure No. 308119 (1989) are also useful.

Defoaming agents that can be used if needed include fluorine-containing compounds, silicone compounds, and chelating agents typified by ethylenediaminetetraacetic acid.

Where the azo dye of the invention is dispersed in an aqueous medium, techniques that are preferably followed include the methods described in JP-A-11-286637, JP-A-2000-78491, JP-A-2000-80259, and JP-A-2000-62370, in which fine coloring particles containing a dye and an oil-soluble polymer are dispersed in an aqueous medium, and the methods of JP-A-2000-78454, JP-A-2000-78491, JP-A-2000-203856, and JP-A-2000-203857, in which a dye dissolved in a high-boiling organic solvent is dispersed in an aqueous medium. The method for dispersing a colorant in an aqueous medium and the kinds and amounts of the oil soluble polymer, the high boiling organic solvent, and additives to be used in carrying out these techniques are selected appropriately with reference to the above-cited publications. A solid colorant could be finely dispersed as such. Dispersants or surface active agents can help dispersing. Suitable dispersing machines include simple stirrers, impeller stirrers, in-line stirrers, mills (e.g., colloid mill, ball mill, sand mill, attritor, roll mill, and agitator mill), ultrasonic dispersers, and high-pressure emulsifiers or homogenizers (e.g., Gaulin Homogenizer, Microfluidizer, and DeBEE 2000). In addition to the aforementioned publications, JP-A-5-148436, JP-A-5-295312, JP-A-7-97541, JP-A-7-82515, JP-A-7-118584, JP-A-11-286637, and JP-A-2000-87539 furnish information about ink jet ink formulations, which can be made use of in the preparation of the ink of the invention.

The aqueous medium includes water as a main component, and the mixture to which a water-miscible organic solvent is added can be used if desired. The water-miscible organic solvent includes alcohols (e.g., methanol, ethanol, propanol, isopropyl alcohol, butanol, isobutanol, sec-butanol, tert-butanol, pentanol, hexanol, cyclohexanol, and benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerol, hexanetriol, and thiodiglylol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). The water-miscible organic solvents can be used either individually or as a combination thereof.

The ink jet ink of the present invention preferably contains the azo dye of the ivnention in an amount of 0.2 to 10 parts by weight per 100 parts by weight of the total ink formulation. The ink jet ink may contain known colorants in addition to the azo dye of the invention. In case of using two of more kinds of colorants together, it is preferred that a total concentration of colorants be within in the above range. The azo dye of the invention is used primarily in magenta tone ink formulations described infra but also in black-tone ink formulations.

As the colorants used together, arbitrary colorants can be used in combination. In the case of magenta tone ink, aryl- or heteryl-azo dyes having, as a coupling component (hereinafter referred to as a coupler component), phenols, naphthols, anilines, heterocyclic rings, e.g., pyrazine, or open-chain active methylene compounds; azomethine dyes having open-chain active methylene compounds as a coupler component; and anthrapyridone dyes (e.g., the compound of No. 20 in Table 1 disclosed in U.S. 2004/0239739A1, and compound (13) disclosed in WO 04/104108) can be exemplified.

The ink jet ink of the invention is used to form not only monochromatic but full color images. For full-color image formation, magenta tone ink, cyan tone ink, and yellow tone ink are used. Black tone ink may be used in combination for tone adjustment As the applicable yellow tone dye, arbitrary ones can be used. Suitable yellow tone dye includes aryl- or heterylazo dyes having, as a coupler component, phenols, naphthols, anilines or hetero rings (e.g., pyrazolone and pyridone), open-chain active methylene compounds, etc.; azomethine dyes having open-chain active methylene compounds as a coupler component; methine dyes, such as benzylidene dyes and monomethine oxonol dyes; quinone dyes, such as naphthoquinone dyes and anthraquinone dyes; quinophthalone dyes; nitro dyes; nitroso dyes; acridine dyes; and acridinone dyes.

As the applicable cyan tone dye, arbitrary ones can be used. Suitable cyan tone dyes include aryl- or heterylazo dyes having, as a coupler component, phenols, naphthols, anilines, etc.; azomethine dyes having, as a coupler component, phenols, naphthols, hetero rings (e.g., pyrrolotriazole), etc.; polymethine dyes, such as cyanine dyes, oxonol dyes, and merocyanine dyes; carbonium dyes, such as diphenylmethane dyes, triphenylmethane dyes, and xanthene dyes; phthalocyanine dyes; anthraquinone dyes; indigo dyes; and thioindigo dyes.

Yellow or cyan which do not develop a color until part of their chromophore is dissociated may also be used. Counter cations in this type of dyes include inorganic ones such as alkali metals and ammonium, organic ones such as pyridinium and a quaternary ammonium salt, and polymeric ones having such a cation as a partial structure.

Black tone materials that can be used include disazo dyes, trisazo dyes, tetraazo dyes, and a carbon black dispersion.

Ink Jet Recording Method

The ink jet recording method according to the present invention comprises applying energy to the above-described ink jet ink of the invention to form an image on known image receiving media, such as plain paper, resin coated paper, dedicated paper described, e.g., in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947, films, paper for both ink jet printing and electrophotography, fabric, glass, metal, and earthenware.

A polymer latex compound can be used together in image formation to impart gloss, water resistance or improved weather ability to an image. The latex compound may be supplied to an image receiving medium before, after or simultaneously with image formation. In other words, the polymer latex compound may be present in either the image receiving medium or the ink or be separately applied in the form of liquid. Specifically, the methods proposed in the specification of JP-A-2000-363090, JP-A-2000-315231, JP-A-2000-354380, JP-A-2000-343944, JP-A-2000-268952, JP-A-2000-299465, and JP-A-2000-297365 can be followed.

Hereinafter, a recording paper and a recording film that are image receiving materials used for ink jet print with the ink of the present invention are described below. Recording paper or film as an image receiving medium that can be used as a medium to be ink jet printed with the ink of the invention usually comprises a substrate and an ink-receiving layer, and, if desired, a backcoating layer. The substrate of recording paper or film includes paper, synthetic paper, plastic films or sheets. The paper substrate is made from a slurry of chemical pulp, e.g., Laubholz bleached kraft pulp (LBKP) and Nadelholz bleached kraft pulp (NBKP), mechanical pulp, e.g., ground pulp (GP), pressurized ground woodpulp (PGW), refiner mechanical pulp (RMP), thermo-chemical pulp (TMP), chemi-thermo-mechanical pulp (CTMP), chemi-mechanical pulp (CMP), and chemi-ground pulp (CGP), used paper pulp, e.g., deinked pulp (DIP), and the like, which can contain, if desired, known additives, such as pigments, binders, sizes, fixatives, cationic agents, paper strengthening agents, and so forth by papermaking techniques using a fourdrinier paper machine, a cylinder paper machine, etc. The substrate preferably has a thickness of 10 to 250 μm and a grammage of 10 to 250 g/m$^2$. An ink receiving layer and a backcoating layer may be provided on the substrate either directly or after sizing with starch, polyvinyl alcohol, etc. or forming an anchor coat. The substrate may be smoothened on a machine calender, a temperature-gradient calender, a soft nip calender, etc. Substrates suitable for printing with the ink of the invention include paper laminated on both sides with a polyolefin (e.g., polyethylene), polystyrene, polyethylene terephthalate, polybutene, or a copolymer comprising monomer units of these homopolymers, and plastic films. It is preferred to add to the laminating resin a white pigment (e.g., titanium oxide or zinc oxide) or a tinting dye (e.g., Cobalt Blue, ultramarine or neodymium oxide).

The ink receiving layer provided on the substrate is formed of a pigment, preferably a white pigment, and an aqueous binder. Useful white pigments include inorganic ones, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic ones, such as styrene pigments, acrylic pigments, urea resins, and melamine resins. Porous inorganic white pigments are preferred. Those with a large pore surface area, such as synthetic amorphous silica, are still preferred. Silicic acid anhydride obtained Baby a dry process and hydrous silicic acid obtained by a wet process are both usable. Hydrous silicic acid is particularly preferred.

The aqueous binder used in the ink receiving layer includes water-soluble polymers, such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxide, and polyalkylene oxide derivatives; and water-dispersible polymers, such as styrene-butadiene latices and acrylic emulsions. These aqueous binders can be used either individually or as a mixture of two or more thereof. Preferred of them are polyvinyl alcohol and silanol-modified polyvinyl alcohol in view of their adhesion to pigment particles and capability of forming a peel resistant coat.

The ink receiving layer can further contain mordants, waterproofing agents, light fastness improvers, surface active agents, and other additives in addition to the pigment and aqueous binder.

The mordant to be added to the ink receiving layer is preferably immobilized. In that regard, polymeric mordants are preferably used. Polymeric mordants are described in JP-A-48-28325, JP-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940; JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. Image receiving materials containing the polymeric mordants disclosed in JP-A-1-161236, pp. 212-215 are particularly preferred. The polymeric mordants of JP-A-1-161236 are effective to form images with high print quality and improved light fastness.

Waterproofing agents are effective to render images waterproof. Cationic resins are preferred waterproofing agents. Examples of suitable cationic resins are polyamide-polyamine epichlorohydrin, polyethylene-imine, polyamine sulfone, dimethyldiallylammonium chloride polymer, cationic polyacrylamide, and colloidal silica. Polyamide-polyamine epichlorohydrin is particularly suited. The cationic resin is preferably used in an amount of 1% to 15% by weight, still preferably 3% to 10% by weight, based on the total solids content of the ink receiving layer.

Light fastness improvers include zinc sulfate, zinc oxide, hindered amine antioxidants, and benzophenone or benzotriazole ultraviolet absorbers. Zinc sulfate is particularly suitable.

Surface active agents in the image receiving layer function as a coating aid, a peeling resistance improver, a slip improver or an antistatic agent. Useful surface active agents are described in JP-A-62-173463 and JP-A-62-183457. Organic fluorine compounds may be used in place of the surface active agents. Hydrophobic organic fluorine compounds are preferred. The organic fluorine compounds include fluorine surface active agents, oily fluorine compounds (e.g., fluorine oil), and solid fluorine compounds (e.g., tetrafluoroethylene resin). Details of the organic fluorine compounds are described in JP-B-57-9053 (cols. 8-17), JP-A-61-20994 and JP-A-62-135826. Other additives that can be added to the ink-receiving layer include pigment dispersants, thickeners, defoaming agents, dyes, fluorescent whitening agents, antiseptics, pH adjustors, matting agents, and hardeners. The ink-receiving layer can have a single or double layer structure.

The backcoating layer, which can be provided if desired, is formed of a white pigment, an aqueous binder, and additives. The white pigment includes inorganic ones such as light precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide; and organic ones such as styrene plastic pigments, acrylic plastic pigments, polyethylene, hollow particles, urea resins, and melamine resins.

Aqueous binders which can be used in the backcoating layer include water-soluble polymers such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone; and water-dispersible polymers such as styrene-butadiene latices and acrylic emulsions. Additives that can be used in the backcoating layer include defoaming agents, foam-suppressors, dyes, fluorescent whitening agents, antiseptics, and waterproofing agents.

A polymer latex may be incorporated into any layer constituting the paper or film for ink jet recording inclusive of the backcoating layer for the purpose of improving film properties, for example, dimensional stabilization, curling prevention, anti-blocking, and crack prevention. For the details refer to JP-A-62-245258, JP-A-62-136648, and JP-A-62-110066. Addition of a polymer latex having a low glass transition temperature (40° C. or lower) into a layer containing a mordant will prevent cracking or curling. Addition of a polymer latex having a high glass transition temperature to a backcoating layer is also effective for curling prevention.

The ink jet ink according to the present invention is applicable to any known ink jet recording systems, such as an electrostatic system in which ink droplets are ejected by an electrostatic attracting force, a drop-on-demand system in which vibrating pressure by a piezoelectric element is utilized (pressure pulse system), an acoustic system in which electrical signals are converted to an acoustic beam, which is applied to ink, and ink is ejected by making use of a radiating pressure, and a thermal system in which vapor bubbles are generated by heat to eject ink droplets. Ink jet recording includes a system in which a number of fine droplets of low concentration ink called photoink are ejected, a system in which a plurality of ink formulations having substantially the same hue but different concentrations are used to improve image quality, and a system of using colorless transparent ink.

The present invention will now be illustrated in greater detail with reference to Examples, but it should be understood that the invention is not deemed to be limited thereto. Unless otherwise noted, all the percents and parts are by weight.

EXAMPLE 1

Synthesis of Compound d-5

(1) Synthesis of Compound d-5a

A mixture of 24.1 g (0.147 mol) of 5-amino-3-t-butyl-4-cyanopyrazole (1), 45 ml of concentrated hydrochloric acid, 30 ml of acetic acid, and 45 ml of propionic acid was stirred at an inner temperature of 0° C. A solution of 10.1 g (0.147 mol) of sodium nitrite in 20 ml of water was added thereto dropwise over 10 minutes, followed by stirring for 30 minutes to form a diazonium salt.

Separately, 84.7 g (0.147 mol) of coupling component (2) was dissolved in a mixture of 231 ml of methanesulfonic acid, 147 ml of acetic acid, and 221 ml of propionic acid, and the solution was stirred at 0° C. The diazonium salt was put into the solution over 30 minutes. After the addition, the stirring was continued for an additional 30 minute period. The reaction mixture was slowly added to 2250 ml of water containing 750 g of ice while stirring. The precipitate thus formed was collected by filtration by suction to give 73.8 g (Yield: 85%) of compound d-5a.

(2) Synthesis of Compound d-5b

To 21 g (35.5 mmol) of compound d-5a were added 26.6 g (157 mmol) of 2-chlorobenzothiazole (heterylating agent 3), 21.7 g of potassium carbonate, and 147 ml of dimethyl sulfoxide (DMSO), and the mixture was stirred at an inner temperature of 92° C. for 4 hours while bubbling nitrogen. After completion of the reaction, the reaction mixture was cooled to room temperature. The precipitate thus formed was collected by suction filtration, and the collected crude crystals were dispersed in 3 liter water to dissolve excess potassium carbonate. The mixture was filtered by suction to give 20.0 g (Yield:63.5%) of compound d-5b.

$\lambda_{max}$=558 nm (DMF solution)

m/z (positive-ion mode)=858

(3) Synthesis of Compound d-5

Two grams (2.33 mmol) of compound d-5b was dispersed in 7 g of sulfolane (from Tokyo Kasei Kogyo Co., Ltd.), and 1.7 g of Nisso Sulfan (sulfur trioxide available from Nisso Metallo chemical Co., Ltd.) was added dropwise to the dispersion. After the addition, the mixture was allowed to react at an inner temperature of 70° C. for 2 hours. After completion of the reaction, the reaction mixture was cooled to 20° C., and 2 ml of water was added dropwise. The inner temperature was dropped to 5° C., and 3.3 ml of a 25 wt % aqueous sodium hydroxide solution, 0.8 ml of a 28 wt % solution of sodium methoxide in methanol, and 4 ml of methanol were added dropwise in the order described. The inorganic salt thus precipitated was collected by filtration and washed with 2 ml of methanol. To the filtrate were added 2 g of potassium acetate and 5.6 ml of methanol, and 22.5 ml of ethanol was then added. The formed precipitate was collected by suction filtration and washed with ethanol to give crude crystals of compound d-5. The crude crystals containing the inorganic salt were desalted by gel chromatography on a Sephadex LH-20 (from Pharmacia Biotech) column using a 1:1 by volume mixture of water and methanol as an eluent to yield 2 g (Yield: 66%) of compound d-5.

$\lambda_{max}$=567.1 nm (in DMSO)

$\epsilon$=46900

Synthesis of compound d-5

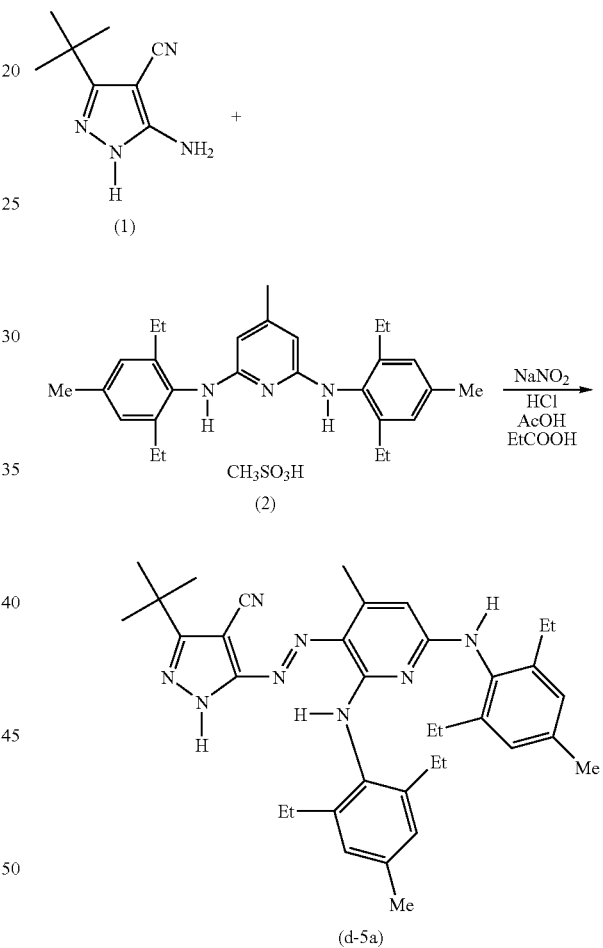

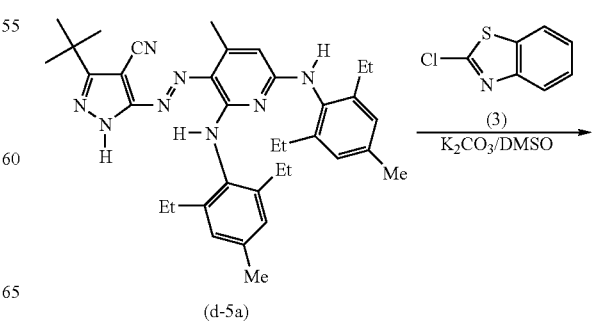

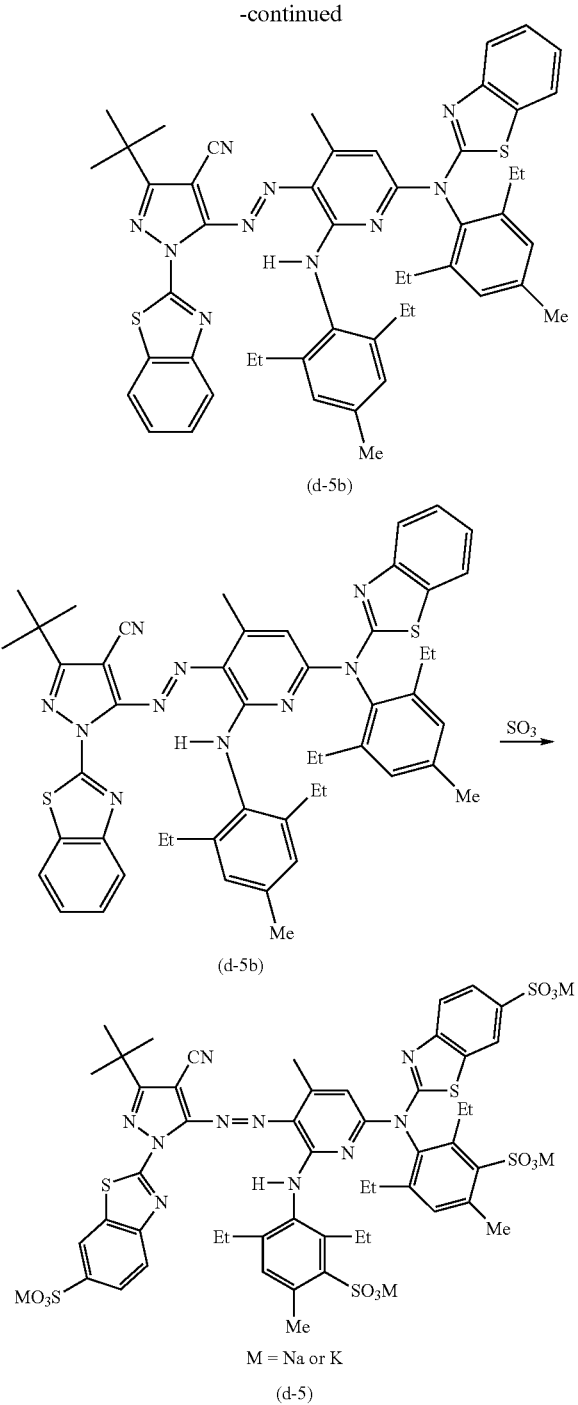

(d-5b)

(d-5b)

(d-5)

M = Na or K

EXAMPLE 2

Synthesis of Compound d-5 (No. 2)

Thirty-three (33) ml of a 30% fuming sulfuric acid was cooled at 10° C., and 4.7 g (8.00 mmol) of compound d-5b was dividedly added thereto at an inner temperature of 25° C. or less. After the reaction mixture was allowed to react at an inner temperature of 30° C. for 2.5 hours, the inner temperature was lowered to 0° C., and 24 ml of water and 42 ml of 28% aqueous ammonia were dropwise added thereto in this order. After the dye was extracted with 26 ml of isopropanol/n-butanol (21/5), the pH was adjusted to 9 with a 25 weight % sodium hydroxide aqueous solution, and 20 ml of ethanol was dropwise added thereto. The precipitated inorganic salt was filtered off and, after 10 ml of methanol, 6.0 g of sodium acetate and 2.4 g of potassium acetate were added and the inner temperature was raised to 65° C., 80 ml of ethanol was dropwise added to the reaction mixture. The temperature of the reaction mixture was lowered to room temperature, and the precipitated crystals were collected by filtration. The obtained crystals were dissolved in 36 ml of water, and the solution was passed through a packed column of a cylindrical column packed with 50 ml of a-lithium type strong acid cation exchange resin (a resin obtained by converting Amberlite IR-120B, trade name, manufactured by Organo to a lithium type) at 25° C. and a flow rate of about SV4. The pH of the passed aqueous solution was adjusted to 7 with a dilute lithium hydroxide aqueous solution, and the aqueous solution was filtered through a membrane filter having an average pore diameter of 0.22 μm. The filtrate was concentrated, dried and solidified with a rotary evaporator under reduced pressure. The obtained crystals were dried at 70° C. overnight to obtain 4.0 g (yield: 41%, in terms of dye d-5) of a lithium salt of a dye comprising dye d-5 as a main component.

$\lambda_{max}$=566.9 nm (in DMSO)

$\epsilon$=45800

Synthesis of compound d-5

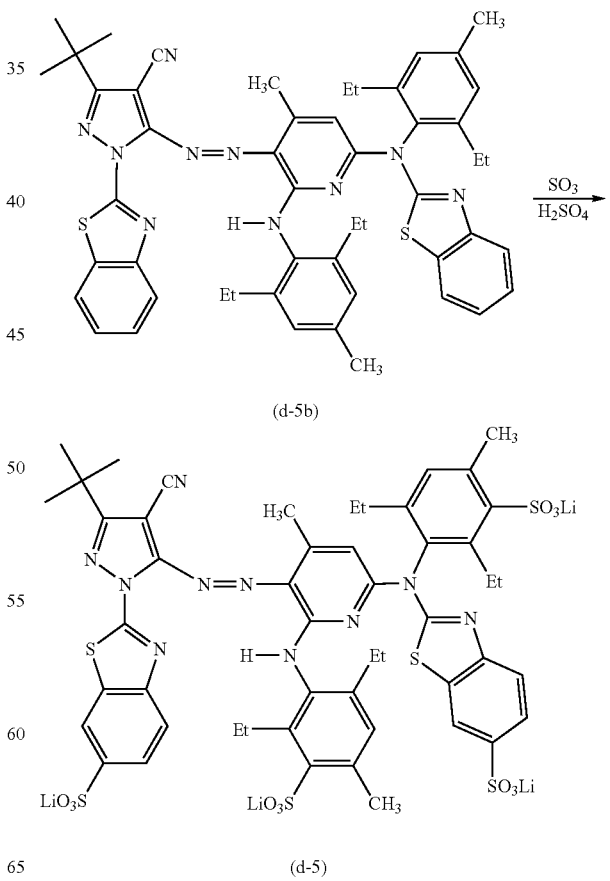

(d-5b)

(d-5)

EXAMPLE 3

Synthesis of Compound d-6

Twelve (12) ml of a 30% fuming sulfuric acid was cooled at 10° C., and 2.49 g (3.00 mmol) of compound d-6b was dividedly added thereto at an inner temperature of 25° C. or less. After the reaction mixture was allowed to react at an inner temperature of 25° C. for 2 hours, the inner temperature was lowered to 0° C/, and 12 ml of water and 20 ml of 28% aqueous ammonia were dropwise added thereto. After the dye was extracted with 10 ml of isopropanol, the pH was adjusted to 9 with a 25 weight % sodium hydroxide aqueous solution, and 10 ml of ethanol, 5.88 g of potassium hydroxide/20 ml of methanol, and isopropanol were dropwise added thereto in this order. The temperature of the reaction mixture was lowered to room temperature, and the precipitated crystals were recovered by filtration to obtain compound d-6 as crude crystals. The crude crystals containing the inorganic salt were desalted and purified by isolation with gel chromatography on a Sephadex LH-20 (manufactured by Pharmacia Biotech) column using a 1/1 by volume mixture of water and methanol as an eluent. The thus-obtained crystals were dissolved in water, and the solution was passed through a packed column of a cylindrical column packed with 200 ml of lithium type strong acid cation exchange resin (a resin obtained by converting Amberlite IR-120B, trade name, manufactured by Organo to a lithium type) at 25° C. and a flow rate of about SV4. The pH of the passed aqueous solution was adjusted to 7 with a dilute lithium hydroxide aqueous solution, and the aqueous solution was filtered through a membrane filter having an average pore diameter of 0.22 μm. The filtrate was concentrated, dried and solidified with a rotary evaporator under reduced pressure to obtain 1.94 g (yield: 55%) of compound d-6.

$\lambda_{max}$=566.0 nm (in DMSO)

$\epsilon$=48100

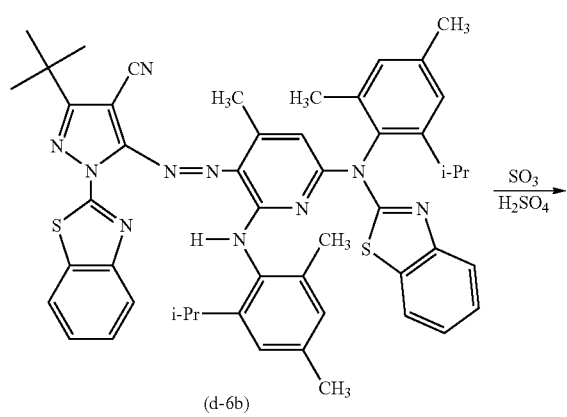

Synthesis of compound d-6

(d-6b)

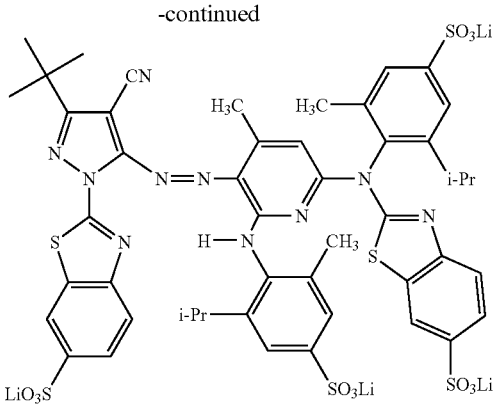

(d-6)

EXAMPLE 4

Synthesis of Compound c-2

Synthesis of Compound c-2a

Compound 3 (11.0 g) (22.7 mmol) was dispersed in 37.8 g of sulforan (manufactured by Tokyo Kasei Kogyo Co., Ltd.), and 5.9 ml of Nisso sulfan (sulfur trioxide) was dropwise added to the dispersion at an inner temperature of 15° C. After completion of the dropwise addition, the reaction mixture was allowed to react at an inner temperature of 50° C. for 4 hours. After completion of the reaction, the reaction solution was cooled to 20° C., and 11.8 ml of water was dropwise added thereto. The inner temperature was lowered to 10° C. or less, and a methanol solution containing lithium hydroxide monohydrate was dropwise added thereto to reach pH 7 of the solution. The precipitated inorganic salt was filtered and washed with about 5 ml of isopropanol. The filtrate was concentrated, isopropanol was added again, and the precipitated inorganic salt was again filtered off. The filtrate was concentrated, the temperature of the concentrated solution was raised to 50° C., and 200 ml of acetonitrile was dropwise added thereto, followed by heating for 30 minutes while refluxing. The precipitated crystals were filtered and dried under reduced pressure to obtain 16.7 g (yield: 107%, including water and inorganic salt) of compound c-2a.

(2) Synthesis of Compound c-2

2-Amino-5,6-dichlorobenzothiazole (4) (6.57 g) (30.0 mmol) was dissolved in 18 ml of a 2/3 by volume mixture of acetic acid and propionic acid, and the solution was cooled to 0° C. A 40% nitrosylsulfuric acid (6.51 ml) was slowly added thereto with maintaining the inner temperature at 0° C. or less, followed by stirring for 30 minutes. A coupler component c-2a (13.2 g) (20.0 mmol) was dissolved in 150 ml of water, the temperature of the solution was lowered to 50° C., and the diazonium salt was added over 30 minutes. After the addition of the diazonium salt, the reaction mixture was stirred at room temperature for further 1 hour, and the reaction solution was thrown to saturated brine to precipitate crystals. The precipitated crystals were filtered by suction to give compound c-2 as crude crystals. The crude crystals containing inorganic salt were desalted and purified by isolation with gel chromatography on a Sephadex LH-20 (manufactured by Pharmacia Biotech) column using a 1/1 by volume mixture of water and methanol as an eluent. The thus obtained crystals were dissolved in water, and the solution was passed through a packed column of a cylindrical column packed with 200 ml of lithium type strong acid cation exchange resin (a resin obtained by converting Amberlite IR-120B, trade name, manufactured by Organo to a lithium type) at 25° C. and a flow rate of about SV4. The pH of the passed aqueous solution was adjusted to 7 with a dilute lithium hydroxide aqueous solution, and the aqueous solution was filtered through a membrane filter having an average pore diameter of 0.22 μm. The filtrate was concentrated, dried and solidified with a rotary evaporator under reduced pressure to obtain 10.1 g (yield: 57%) of compound c-2.

$\lambda_{max}$=550.0 nm (in DMSO)
$\epsilon$=43100

EXAMPLE 5

Synthesis of Compound a-6

5-Amino-3-methylisothiazole-4-carbonitrile (5) (2.78 g) (20.0 mmol) was dissolved in 40 ml of a 1/1 by volume mixture of phosphoric acid and acetic acid, and the solution was cooled to 0° C. A 40% nitrosylsulfuric acid (7.0 ml) was slowly added thereto with maintaining the inner temperature at 0° C. or less, followed by stirring for 30 minutes. A coupler component c-2a (7.76 g) (20.0 mmol) was dissolved in 100 ml of methanol, the temperature of the solution was lowered to 5° C., and the diazonium salt was added over 30 minutes. After the addition of the diazonium salt, the reaction mixture was stirred at room temperature for further 1 hour, and the reaction

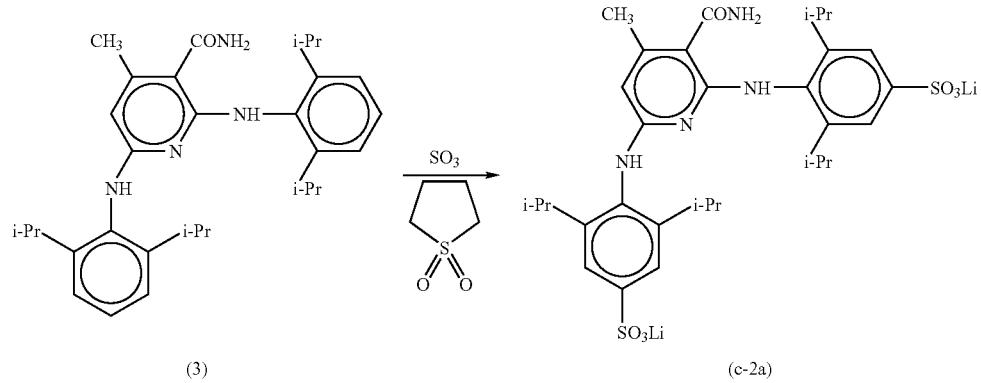

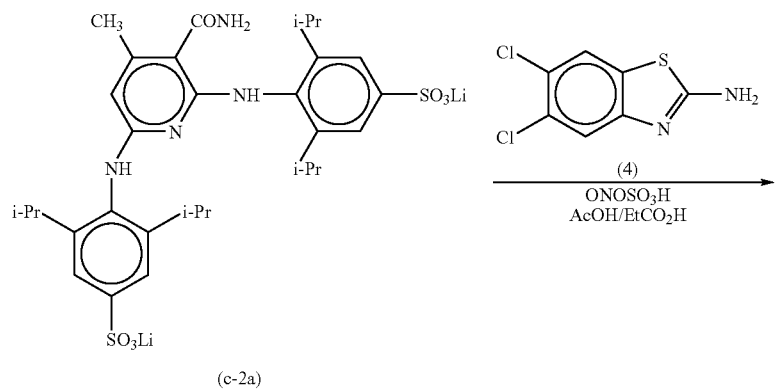

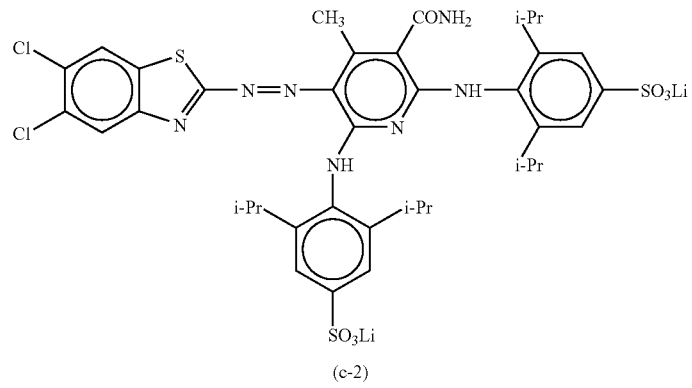

solution was thrown to saturated brine to precipitate crystals. The precipitated crystals were filtered by suction to give compound a-2 as crude crystals. The crude crystals containing inorganic salt were desalted and purified by isolation with gel chromatography on a Sephadex LH-20 (manufactured by Pharmacia Biotech) column using a 1/1 by volume mixture of water and methanol as an eluent. The thus-obtained crystals were dissolved in water, and the solution was passed through a packed column of a cylindrical column packed with 200 ml of lithium type strong acid cation exchange resin (a resin obtained by converting Amberlite IR-120B, trade name, manufactured by Organo to a lithium type) at 25° C. and a flow rate of about SV4. The pH of the passed aqueous solution was adjusted to 7 with a dilute lithium hydroxide aqueous solution, and the aqueous solution was filtered through a membrane filter having an average pore diameter of 0.22 μm. The filtrate was concentrated, dried and solidified with a rotary evaporator under reduced pressure to obtain 7.4 g (yield: 46%) of compound a-6.

$\lambda_{max}$=548.1 nm (in DMSO)

$\epsilon$=40900

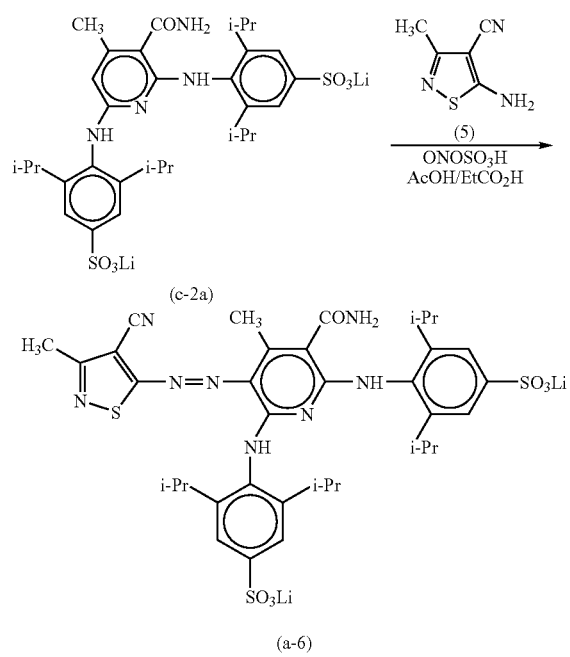

(a-6)

Compounds shown in Table 1 below were synthesized in the same manner as described above. In Table 1 are also shown the yields and absorption maximum wavelengths (in DMSO) of the compounds.

TABLE 1

| Dye | Yield (%) | $\lambda_{max}$ (in DMSO) (nm) |
|---|---|---|
| a-1 | 40 | 550 |
| a-2 | 46 | 548 |
| a-3 | 43 | 551 |
| a-4 | 51 | 540 |
| a-5 | 49 | 543 |
| b-1 | 55 | 539 |
| b-2 | 56 | 540 |
| b-3 | 60 | 541 |

TABLE 1-continued

| Dye | Yield (%) | $\lambda_{max}$ (in DMSO) (nm) |
|---|---|---|
| b-4 | 59 | 546 |
| b-5 | 45 | 544 |
| c-1 | 44 | 539 |
| c-2 | 57 | 550 |
| c-3 | 38 | 551 |
| c-4 | 54 | 554 |
| c-5 | 60 | 556 |
| d-1 | 45 | 540 |
| d-2 | 50 | 555 |
| d-3 | 60 | 565 |
| d-4 | 60 | 563 |
| d-6 | 55 | 566 |
| d-7 | 50 | 566 |
| d-8 | 45 | 555 |
| d-11 | 40 | 540 |
| d-12 | 43 | 540 |
| d-13 | 52 | 530 |
| d-16 | 65 | 566 |
| d-17 | 65 | 564 |
| d-18 | 63 | 560 |

EXAMPLE 6

Preparation of Aqueous Ink

The following components were mixed, heated at 30 to 40° C. for 1 hour while stirring, and filtered by suction through a microfilter with an average pore size of 0.8 μm and a diameter of 47 mm to prepare ink liquid A.

Composition of Ink Liquid A:

| | |
|---|---|
| Dye d-5 | 5 parts |
| Diethylene glycol | 9 parts |
| Tetraethylene glycol monobutyl ether | 9 parts |
| Glycerol | 7 parts |
| Diethanolamine | 1 part |
| Water | 70 parts |

Ink liquids B to I were prepared in the same manner as for ink liquid A, except for replacing dye d-5 with the dye shown in Table 2 below.

Image Recording and Evaluation

An image was recorded on photo glossy paper (Super Photo Grade, available from Fuji Photo Film Co., Ltd.) on ink jet printer (PM-770C, available from Seiko Epson Corp.) by using each of ink liquids A to I. The resulting image was evaluated for hue, light fastness, and ozone resistance as follows. The results obtained are shown in Table 2.

As to the solubility in water, the evaluation was made by three grade of easily soluble, soluble and insoluble. In the below Table 2, A represents easily soluble; B represents soluble, and C represents insoluble.

As to the hue, the hue was observed with the naked eye and graded on an A to C grade. The observed results are shown in below Table 2. In Table 2, A represents "excellent", B represents "good", and C represents "poor".

As to light fastness, the image density immediately after recording (initial density: Ci) was measured with a reflection densitometer X-Rite 310TR. After the image was exposed to xenon light (85,000 lux) for 7 days in a weatherometer (Atlas C.65, from Atlas Electric Devices Co.), the image density (Cf) was measured again at three points whose initial densities were 1, 1.5, and 2.0. A dye retention (%) was calculated from equation:

Dye retention (%)=[(Ci−Cf)/Ci]×100

An image having a dye retention of 80% or higher at every measuring point was graded A. An image having a dye retention lower than 80% at one or two out of three points was graded B. An image having a dye retention lower than 80% at every point was graded C.

As to ozone resistance, the recorded image was left to stand in a chamber having an ozone gas concentration of 5 ppm for 24 hours. A dye retention after exposure to ozone was obtained in the same manner as for evaluation of light fastness. The ozone concentration in the chamber was set with an ozone gas monitor (OZG-EM-01, available from Applics Co., Ltd.). An image having a dye retention of 70% or higher at every measuring point was graded A. An image having a dye retention lower than 70% at one or two out of three points was graded B. An image having a dye retention lower than 70% at every point was graded C.

TABLE 2

| Ink Composition | Dye | Counter Ion | Solubility in Water | Hue | Light Fastness | O-zone fastness | Remark |
|---|---|---|---|---|---|---|---|
| A | d-5 | Na/K | A | A | A | A | invention |
| B | d-5 | Li | A | A | A | A | invention |
| C | d-3 | K | A | A | A | A | invention |
| D | d-3 | Li | A | A | A | A | invention |
| E | d-4 | Li | A | A | A | A | invention |
| F | d-6 | Li | A | A | A | A | invention |
| G | h-1 | None | A | A | A | B | comparison |
| H | h-2 | None | B | B | B | C | comparison |
| I | h-3 | None | B | A | C | C | comparison | h-1

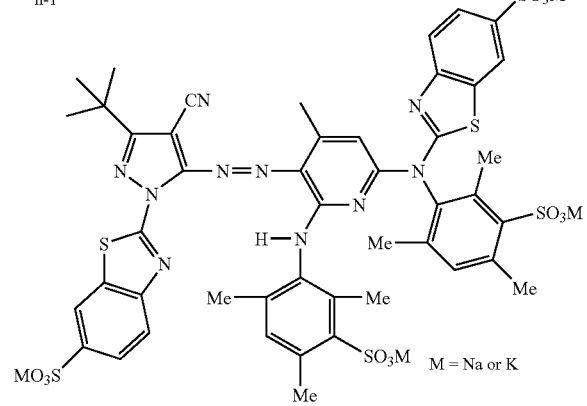

h-2

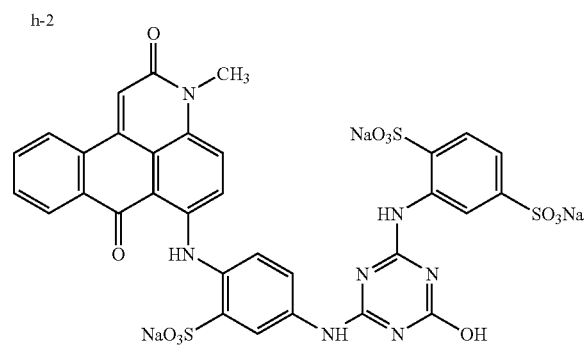

h-3

[chemical structure]

As is seen from Table 2, the magenta images printed in ink compositions A to F are clearer than those printed in ink compositions G to I. In addition, the images printed in ink compositions A to F are excellent in light fastness.

Further, photographic glossy paper (KA450PSK, available from Seiko Epson) was printed on the same ink jet printer (PM-770C, from Seiko Epson) by using ink compositions A to F. Evaluation of the resulting images for hue and light fastness gave satisfactory results similar to those shown in Table 2.

EXAMPLE 7

Ink jet printing was carried out on professional photo glossy paper PR-101 (available from Canon Inc.) with an ink jet printer BJ-F850 (from Canon Inc.) loaded with an ink cartridge filled with each of the ink compositions prepared in Example 6. The results of evaluation of the images were similar to those obtained in Example 6.

According to the present invention, (1) a novel dye having absorption characteristics in favor of reproduction of three primary colors and sufficient fastness to light, heat, humidity, and environmental active gases and a process of producing the dye are provided.

(2) Various coloring compositions providing color images and coloring materials excellent in hue and fastness are provided, including (a) ink compositions for printing, such as ink jet printing, (b) ink sheets of thermal transfer image recording materials, (c) electrophotographic toners, (d) coloring materials for color filters used in displays, e.g., LCDs and PDPs, and image sensors, e.g., CCDs, and (e) dye baths for various fibers.

(3) An ink jet ink providing color images with good hues and high colorfastness to light and environmental active gases particularly ozone gas is provided.

One of the great structural characteristics of the azo dyes represented by formula (I) and (II) is a variety of substituents a and e in formulae and their combinations (a and e each independently represents an alkyl group, an alkoxy group or a halogen atom, and when a and e both represent an alkyl group, the two alkyl groups have at least three carbon atoms in total in the alkyl moieties thereof that constitute the alkyl groups, and each of the alkyl groups may be substituted.), therefore it is presumed that the decomposition of the azo dye against particularly active gases in the environment (e.g., ozone) is restrained, thereby the azo dye has a high fastness.

The entire disclosure of each and every foreign patent application from which the benefit of foreign priority has been claimed in the present application is incorporated herein by reference, as if fully set forth.

What is claimed is:

1. An azo dye represented by formula (I):

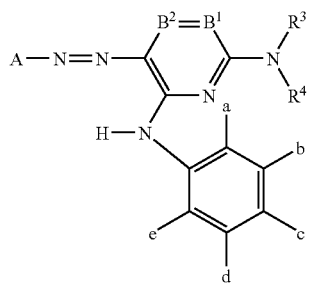

Formula (I)

wherein A represents a residue of a 5-membered heterocyclic diazo component A-NH$_2$;

B$^1$ and B$^2$ each represents =CR$_1$— or =CR$_2$—, or one of B$^1$ and B$^2$ represents a nitrogen atom and the other of B$^1$ and B$^2$ represents =CR$_1$— or =CR$_2$—;

R$^3$ and R$^4$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, each of the groups optionally has a substituent;

R$^1$ and R$^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an alkylamino group, an arylamino group, a heterocyclic amino group, an acylamino group, an ureido group, a sulfamoylamino group, an alkoxycarbonylamino group, an aryloxycarbonylamino group, an alkylsulfonylamino group, an aryloxycarbonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group, each of the groups optionally has a substituent, and R$^1$ and R$^3$ are optionally taken together, or R$^3$ and R$^4$ are optionally taken together, each to form a 5- or 6-membered ring;

a and e each independently represents an alkyl group, and the alkyl groups represented by a and e have at least three carbon atoms in total that constitute the alkyl groups, and each of the groups optionally has a substituent;

b, c, and d each independently has a same meaning as R$^1$ and R$^2$, and a and b are optionally taken together, or e and d are optionally taken together, each to form a condensed ring; and formula (I) has at least one ionic hydrophilic group.

2. The azo dye according to claim 1, which is represented by formula (II):

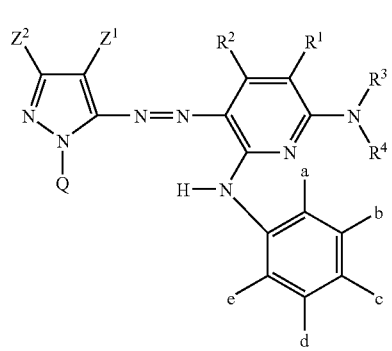

Formula (II)

wherein each of R$^1$, R$^2$, R$^3$, R$^4$, a, b, c, d, and e is the same as defined in formula (I);

Z$^1$ represents an electron attracting group having a Hammett substituent constant σp of 0.20 or more;

Z$^2$ represents a hydrogen atom, an aliphatic group, an aromatic group or a heterocyclic group;

Q represents a hydrogen atom, an aliphatic group, an aromatic group or a heterocyclic group, and each of the groups represented by Z$^1$, Z$^2$, and Q optionally has a substituent; and formula (II) has at least one ionic hydrophilic group.

3. A process of producing a compound represented by formula (II) according to claim 2, the process comprising:

(a) allowing an aminopyrazole represented by formula (III) to react with a diazotizing agent to form a diazonium salt;

(b) allowing the diazonium salt to react with a coupling agent represented by formula (IV) to form a compound represented by formula (II-H1); and (c) allowing the compound represented by formula (II-H1) to react with an alkylating agent, an arylating agent or a heterylating agent in a presence of a base to form a compound represented by formula (II-R1):

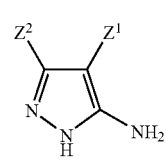

Formula (III)

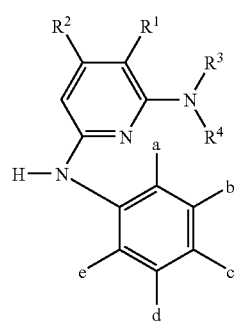

Formula (IV)

-continued

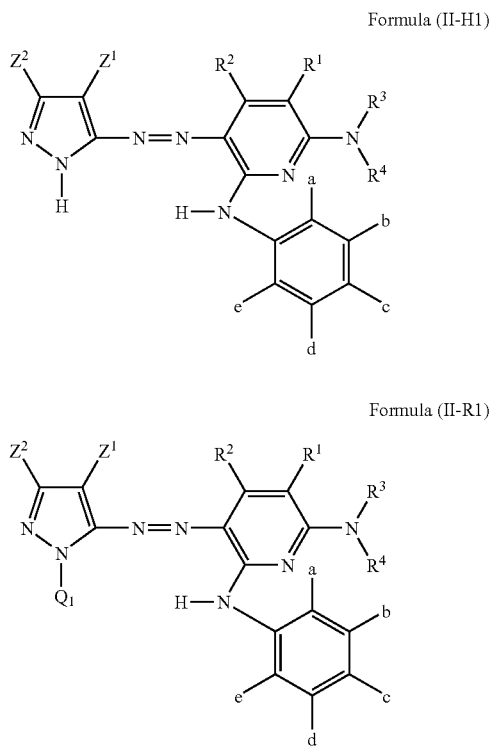

Formula (II-H1)

Formula (II-R1)

wherein each of $Z^1$, $Z^2$, $R^1$, $R^2$, $R^3$, $R^4$, a, b, c, d, and e is the same as defined in formula (II); and $Q_1$ represents an aliphatic group, an aromatic group or a heterocyclic group.

4. The process of producing a compound represented by formula (II) according to claim 3, wherein the compound represented by formula (II-R1) is a compound represented by formula (II-R2):

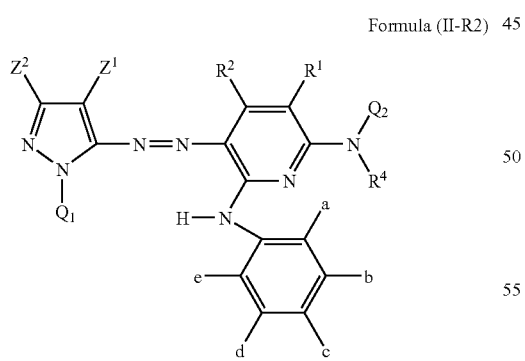

Formula (II-R2)

wherein each of $Z^1$, $Z^2$, $R^1$, $R^2$, $R^3$, $R^4$, a, b, c, d, and e is the same as defined in formula (II); and $Q_1$ and $Q_2$, which are the same or different, each independently represents an aliphatic group, an aromatic group or a heterocyclic group.

5. A process of producing a compound represented by formula (II) according to claim 2, the process comprising:

introducing a water soluble group into a compound represented by formula (II-R1) or formula (II-R2) by an electrophilic reaction, wherein each of $Z^1$, $Z^2$, $R^1$, $R^2$, $R^3$, $R^4$, a, b, c, d, and e is the same as defined in formula (II); and $Q_1$ and $Q_2$, which are the same or different, each independently represents an aliphatic group, an aromatic group or a heterocyclic group.

6. The azo dye according to claim 1,
wherein the at least one ionic hydrophilic group contains a sulfo group.

7. The azo dye according to claim 6,
wherein the sulfo group has a counter ion, and
wherein the counter ion is a lithium ion.

8. An ink jet recording ink comprising at least one azo dye according to claim 1.

9. An ink jet recording method, which comprises forming an image with an ink jet recording ink according to claim 8 on an image receiving material comprising a substrate and an ink receiving layer containing an inorganic white pigment.

10. An ink cartridge comprising an ink jet recording ink according to claim 8.

11. An ink jet printer comprising an ink cartridge according to claim 10.

12. A heat sensitive recording material comprising at least one azo dye according to claim 1.

13. A color toner comprising at least one azo dye according to claim 1.

14. A color filter comprising at least one azo dye according to claim 1.

15. The azo dye according to claim 1, wherein formula (I) comprises 3 to 6 ionic hydrophilic groups.

16. The azo dye according to claim 1, wherein the ionic hydrophilic group is selected from the group consisting of a carboxyl group, a phosphono group, and a sulfo group.

17. The azo dye according to claim 16, wherein the ionic hydrophilic group is a sulfo group.

18. The azo dye according to claim 1, wherein a and e are each a substituted or unsubstituted alkyl group.

19. The azo dye according to claim 1, wherein a + e have 3 to 5 carbon atoms in total.

20. The azo dye according to claim 1, wherein the azo dye is represented by formula (I-1):

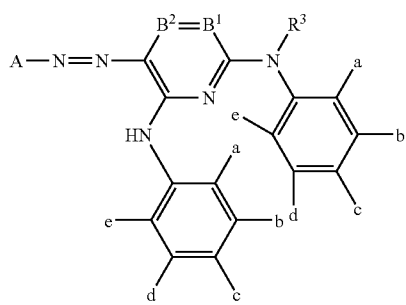

(I-1)

wherein each of A, $B^1$, $B^2$, $R^3$, a, b, c, d and e is the same as defined in formula (I), wherein each a can be the same or different, each b can be the same or different, each c can be the same or different, each d can be the same or different, and each e can be the same or different.

21. The azo dye according to claim 1, wherein the azo dye is represented by formula (I-2):

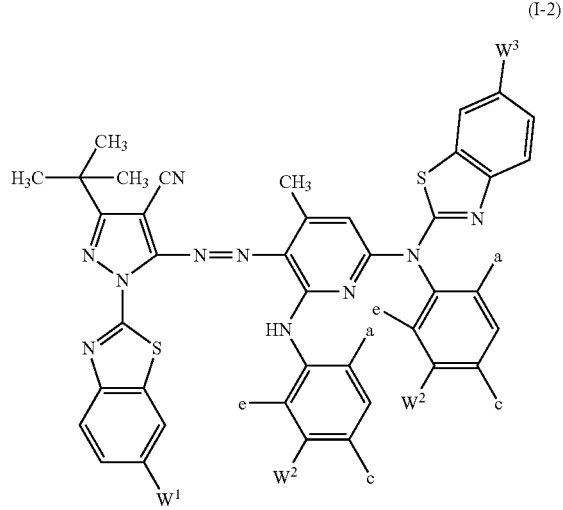

(I-2)

wherein a, c and e each independently represents a hydrogen atom or an unsubstituted alkyl group; $W^1$, $W^2$ and $W^3$ each independently represents a hydrogen atom or a sulfo group, provided that the sum total of the carbon number of a and e per ring is 3 to 6, and all of $W^1$, $W^2$ and $W^3$ are not hydrogens at the same time.

* * * * *